(12) United States Patent
Clarke

(10) Patent No.: US 7,117,647 B2
(45) Date of Patent: Oct. 10, 2006

(54) SYSTEM FOR CONSTRUCTING LOG STRUCTURES

(75) Inventor: Gregory A. Clarke, London (CA)

(73) Assignee: Pointblank Design Inc., London (CA)

( * ) Notice: Subject to any disclaimer, the term of this patent is extended or adjusted under 35 U.S.C. 154(b) by 270 days.

(21) Appl. No.: 10/372,854

(22) Filed: Feb. 26, 2003

(65) Prior Publication Data

US 2004/0163358 A1  Aug. 26, 2004

(51) Int. Cl.
    *E04B 1/10* (2006.01)
(52) U.S. Cl. .................. 52/233; 52/223.13; 52/286; 52/285.2; 52/285.4; 403/192; 403/246; 403/258; 403/259; 403/260; 403/261; 403/264; 405/116
(58) Field of Classification Search ........... 52/223.13, 52/233, 286, 285.1, 285.2, 285.4, 585.1, 52/586.1, 187, 192, 201, 246, 258–261, 264; 405/116
    See application file for complete search history.

(56) References Cited

U.S. PATENT DOCUMENTS

| 2,550,883 A | 5/1951 | St. Vincent |
| 3,440,784 A | 4/1969 | Onjukka |
| 4,224,772 A | 9/1980 | Bene et al. |
| 4,248,285 A | 2/1981 | Flaig |
| 4,279,108 A | 7/1981 | Collister |
| 4,353,191 A * | 10/1982 | Schilbe .................. 52/233 |
| 4,503,647 A | 3/1985 | Post |
| 4,517,780 A | 5/1985 | Lacombe et al. |
| 4,599,837 A | 7/1986 | Wrightman |
| 4,688,362 A | 8/1987 | Pedersen et al. |
| 4,742,657 A | 5/1988 | Veech |
| 4,823,528 A | 4/1989 | Faw |
| 4,832,528 A | 5/1989 | Lisart |
| 4,840,003 A | 6/1989 | Lucas et al. |
| 4,909,012 A | 3/1990 | Thompson, Jr. et al. |
| 5,020,289 A | 6/1991 | Wrightman |
| 5,081,811 A | 1/1992 | Sasaki |
| 5,253,458 A | 10/1993 | Christian |
| 5,325,645 A | 7/1994 | Wrightman |
| 5,505,028 A | 4/1996 | Giles |
| 5,535,561 A | 7/1996 | Schuyler |
| 5,553,906 A | 9/1996 | Kunz |
| 5,787,675 A | 8/1998 | Futagi |
| 5,799,452 A | 9/1998 | Moore |
| 6,023,895 A | 2/2000 | Anderson |

(Continued)

FOREIGN PATENT DOCUMENTS

CA  2348682  2/2000

(Continued)

*Primary Examiner*—Naoko Slack
*Assistant Examiner*—Yvonne M. Horton
(74) *Attorney, Agent, or Firm*—Bereskin & Parr

(57) ABSTRACT

A system for constructing log structures includes a corner connection structure, a through-bolt clamping apparatus, an opening support structure, a butt joint connection structure, a log profile, and an exterior casing structure. The corner connection structure has logs with overlap portions shaped so that the overlap portions of the logs of a first wall overlap and alternately interlace the overlap portions of the logs of a second wall. A generally vertical slot extends through the overlap portions of the logs, and at least one spline is provided in the slot. The through-bolt clamping apparatus has a through-bolt extending along the height of the wall, a lower clamp arm coupled to the through-bolt and the bottom of the intersecting walls, and an upper clamp arm coupled to the through bolt and the top of the intersecting walls.

31 Claims, 29 Drawing Sheets

U.S. PATENT DOCUMENTS

| | | |
|---|---|---|
| 6,050,033 A | 4/2000 | Wrightman |
| 6,050,765 A | 4/2000 | McGovern et al. |
| 6,145,261 A | 11/2000 | Godfrey et al. |
| 6,195,949 B1 | 3/2001 | Schuyler |
| 6,266,934 B1 | 7/2001 | Houseal |
| 6,363,672 B1 | 4/2002 | Baker |
| 6,385,929 B1 | 5/2002 | Englehart |
| 6,543,193 B1 | 4/2003 | Houseal |
| 6,557,316 B1 | 5/2003 | Van Der Heijden |
| 6,904,728 B1 | 6/2005 | Stutts |
| 2002/0121055 A1 | 9/2002 | Englehart |

FOREIGN PATENT DOCUMENTS

| | | |
|---|---|---|
| CA | 2190685 | 6/2004 |
| JP | 2000-226884 | 8/2000 |
| JP | 2002-061287 | 2/2002 |
| JP | 2002-061621 | 2/2002 |

* cited by examiner

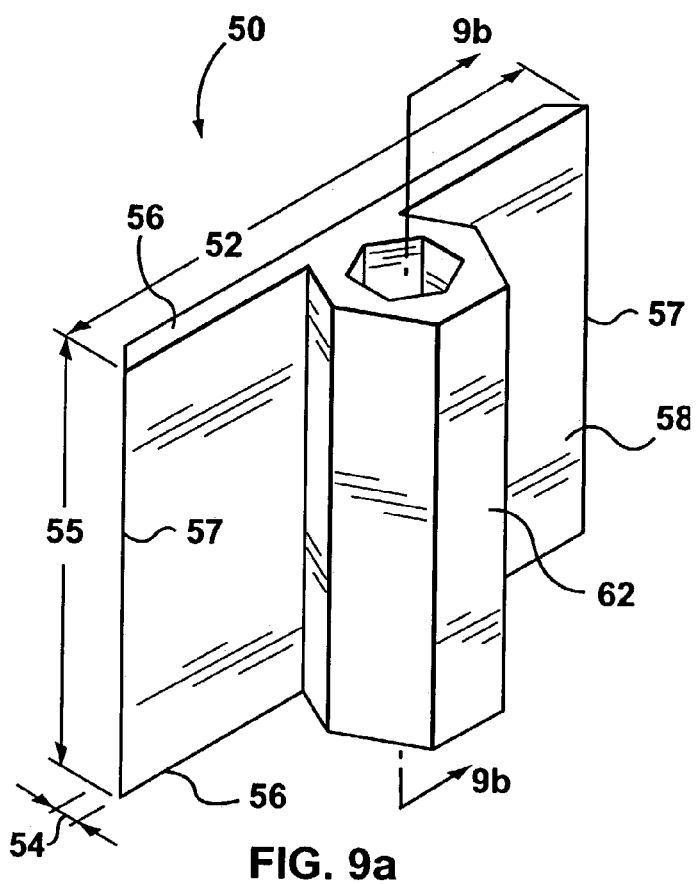
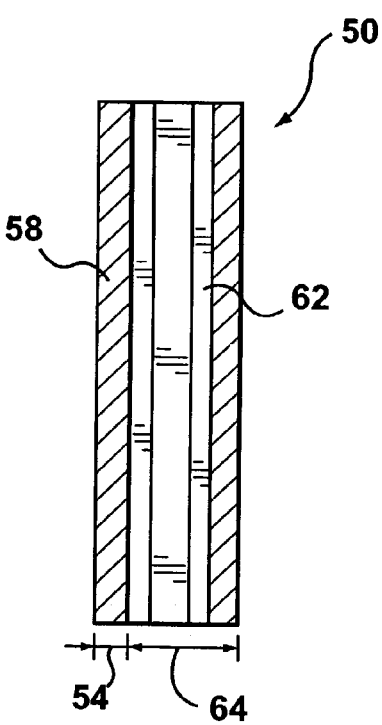
FIG. 9a
FIG. 9b
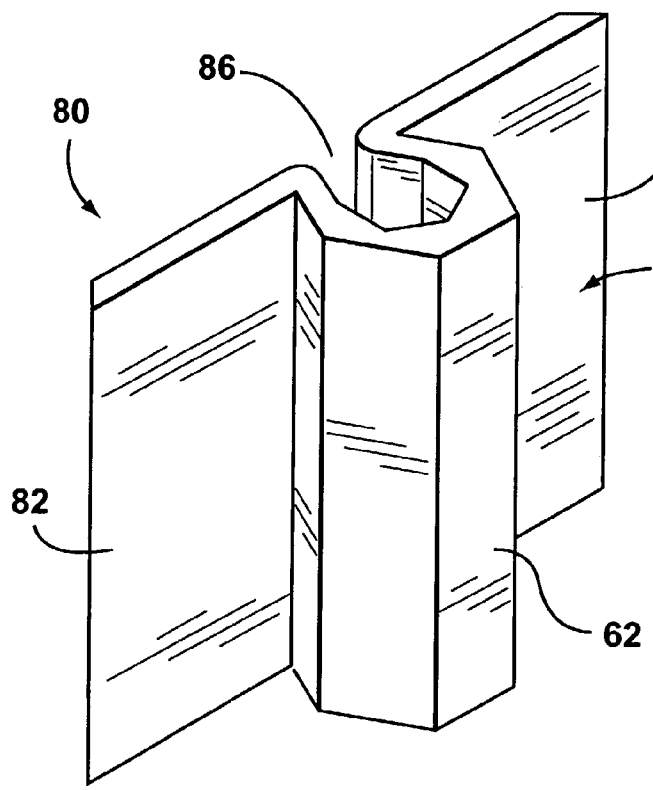
FIG. 11

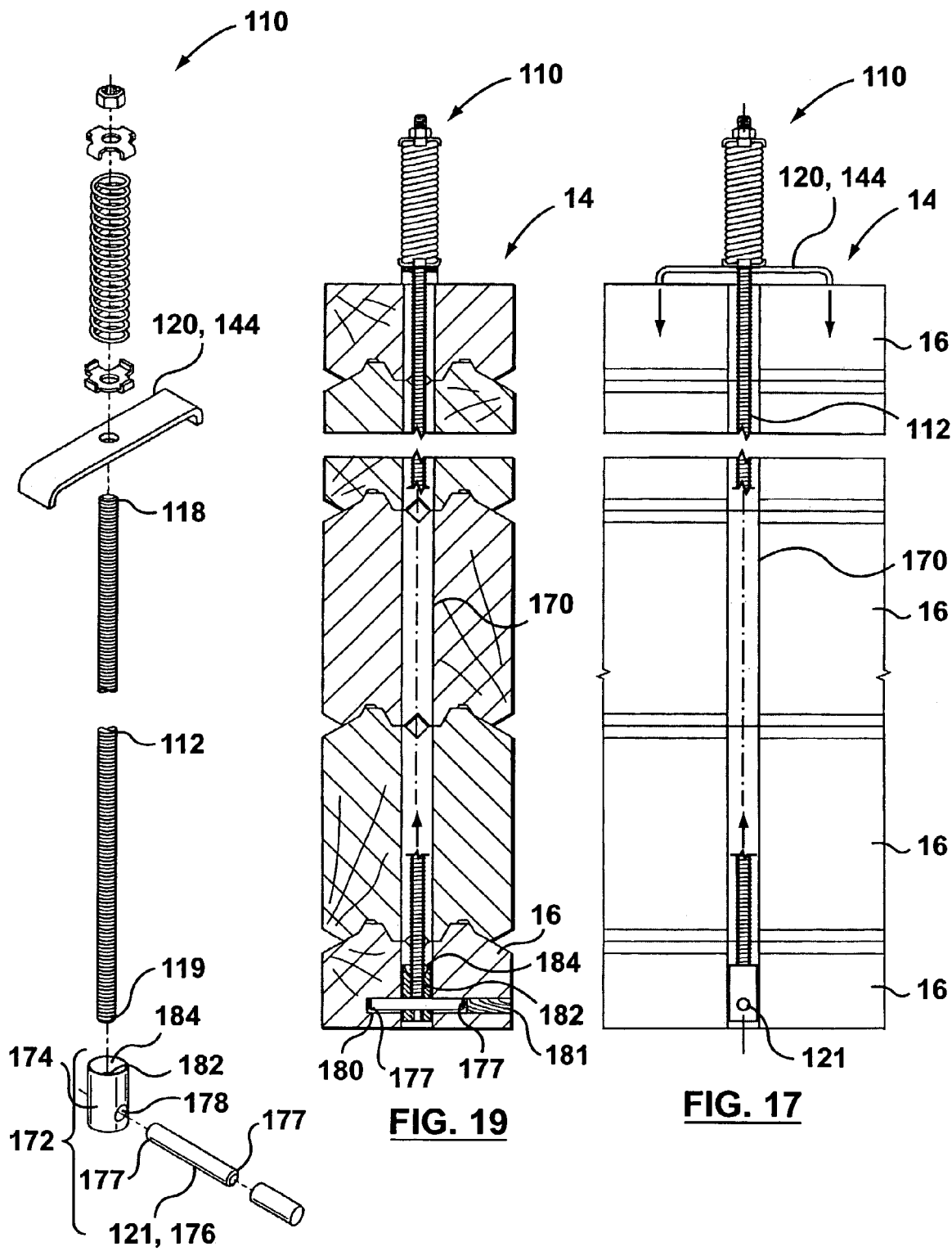

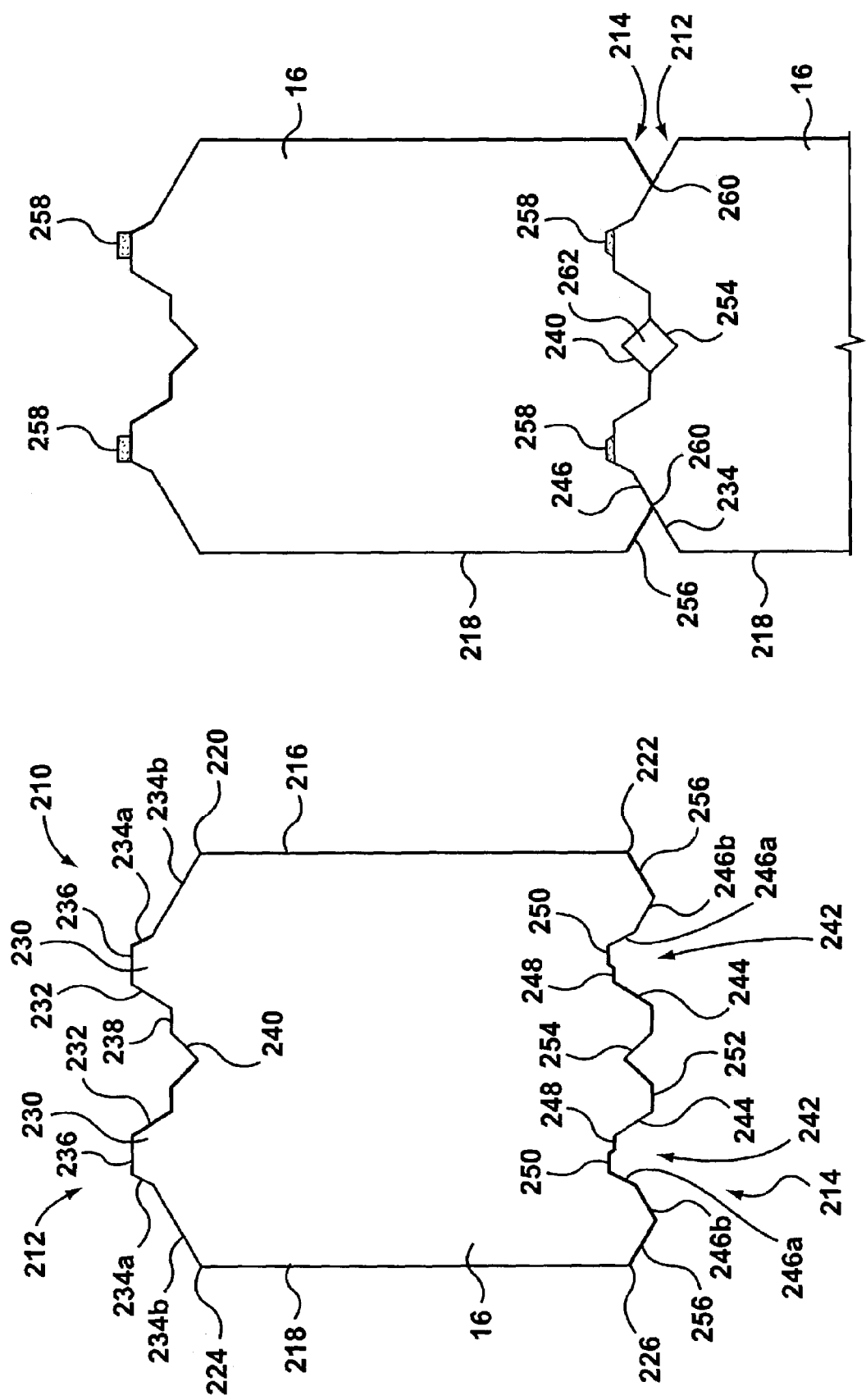

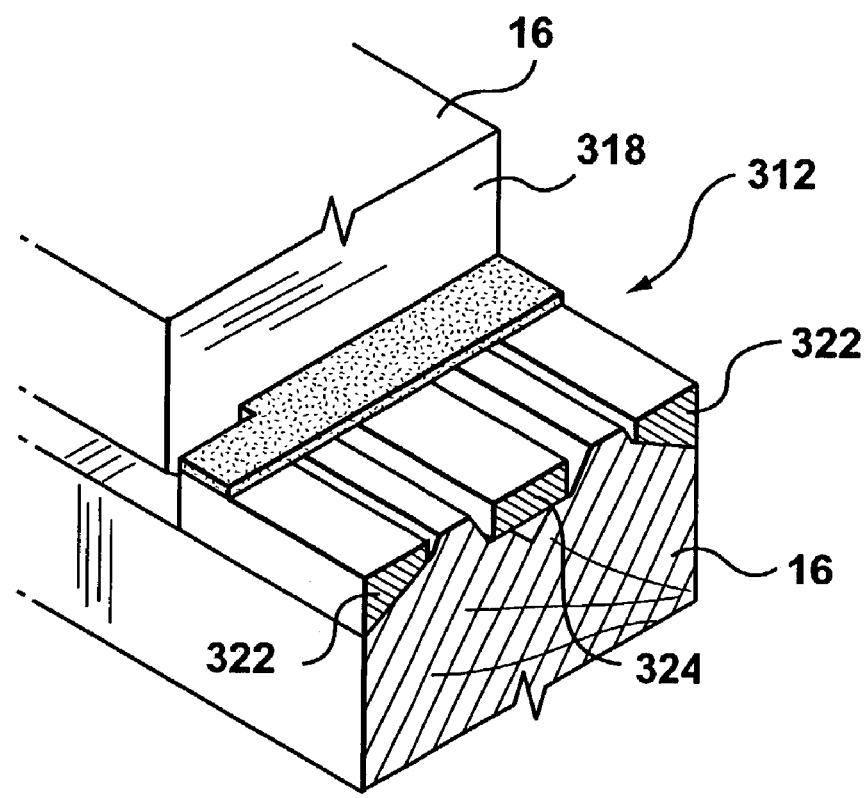
FIG. 27
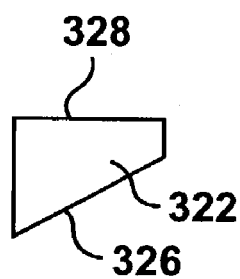 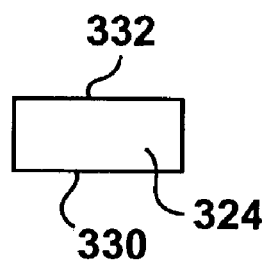
FIG. 28a  FIG. 28b

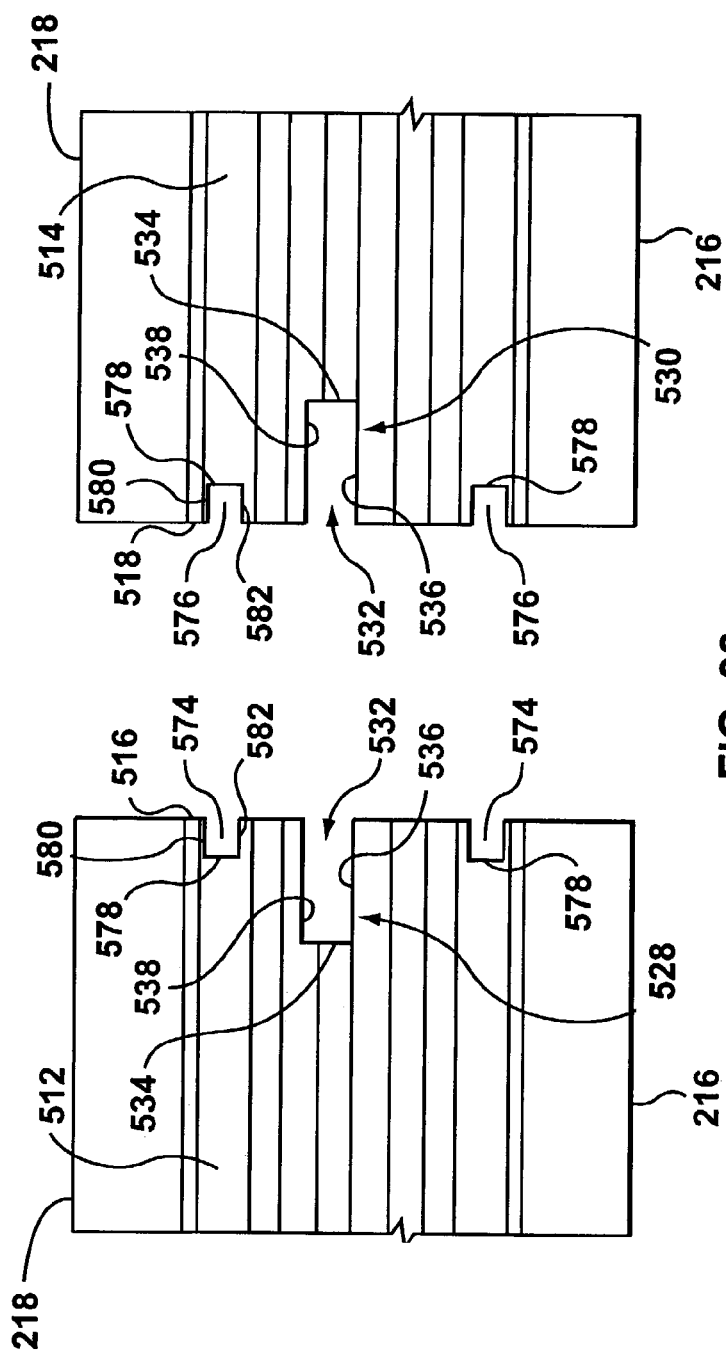
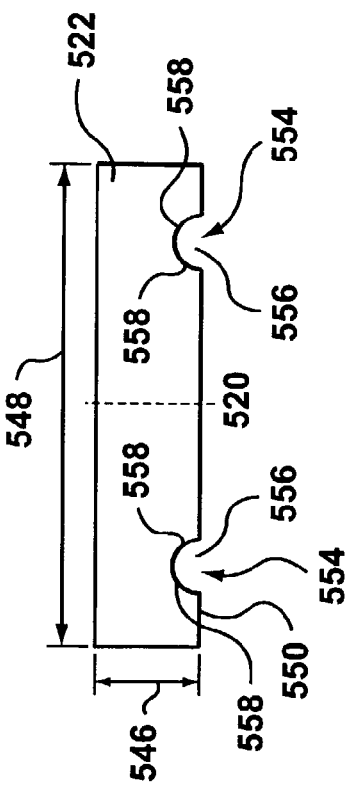
FIG. 38
FIG. 39

SYSTEM FOR CONSTRUCTING LOG STRUCTURES

FIELD OF THE INVENTION

This invention relates to construction systems for constructing log structures such as houses, cabins, and the like

BACKGROUND OF THE INVENTION

Homes or cabins built of logs are often considered desirable for their aesthetics. However, constructing such log structures can present a number of difficulties. For example, it can be difficult to provide corner connection of logs at an intersecting corner that is strong and weather tight, both at initial installation and after the log walls have settled over time.

A known corner connection structure is disclosed in U.S. Pat. No. 5,020,289 (Wrightman). The corner connection of Wrightman provides a dovetail joint between the intersecting logs, and a pair of splines having a 'figure-8' cross-sectional profile. However, the structural elements themselves leave seams through which the weather could penetrate. Caulking could be provided for weather-proofing, but caulking has a limited lifespan, and could work loose during natural settling and shrinkage of the logs. Alternatively, gaskets could be provided between the mating faces of the dovetails, but gaskets can be relatively costly and time-consuming to install.

Another corner connection structure is disclosed in U.S. Pat. No. 4,353,191 (Schilbe). The corner connection structure of Schilbe has an obliquely disposed mortise provided adjacent the intersecting region of logs at a corner, and a wooden locking section placed in the mortise. However, by providing the mortise adjacent the intersecting region, rather than within the intersecting region, the locking member is engaged only at its outer ends by the mortise, which may limit the strength and support provided by the locking member. Furthermore, Schilbe does not address the natural settling of the logs that takes place over time. The fit between the mortise and the locking member, as taught by Schilbe, must be sufficient to prevent horizontal movement of the logs relative to the locking member. However, such a tight fit would also inhibit vertical movement of the logs relative to the locking member, which could result in gaps forming between the logs along the height of the walls at the intersecting corner. The weather may then penetrate the corner structure, and moisture could collect within the log structure, between the inside of the walls and the locking member.

Providing through-bolts at corners or at intermediate positions along the lengths of log walls can provide additional strength and support for the walls. Known through-bolt devices are described in U.S. Pat. No. 4,503,647 (Post) and U.S. Pat. No. 4,688,362 (Pedersen et al.). In both of these references, the through-bolt devices include through-bolts extending along the height of the walls, and regular hex nuts at the lower end of the through-bolts for tightening the devices. These devices require access to the hex nuts for wrenches or other tools when assembling or adjusting the through-bolt devices. However, providing such access may be difficult, and may require, for example, fairly large openings cut into the lower sides of the walls. Specially cut panels may then be required to conceal the openings.

It is often convenient in walls constructed of logs that two shorter logs be joined end-to-end to span the length of the wall. A butt joint for connecting logs end-to-end is disclosed in the patent to Wrightman, already noted above. The butt joint according to Wrightman has a two-piece spline with semi-circular lobes on one face and opposing passages on the opposite face. Spikes are driven into the passages to expand the two-piece spline, and provide an interference fit between the lobes of the spline and matching recesses provided in the logs. This butt joint is fairly complex and may be time consuming to assemble. Furthermore, the simultaneous alignment of the passageways and the lobes within the recesses may be difficult to achieve.

Another butt joint is disclosed in U.S. Pat. No. 4,279,108 (Collister, Jr.). The butt joint of Collister Jr. has plastic weather deflectors inserted into a slot, which spans the seam between the adjacent end faces of the logs to be joined. Compressible gasket strips are also provided between the end faces of the adjacent logs. Since no structural joint element engages the logs in a transverse direction, it may be difficult to ensure that the logs connected by this joint are in fact locked to inhibit longitudinal movement. Furthermore, since the gasket strips are installed prior to fixing the logs together, the strips may be damaged during positioning and assembly of the logs.

Openings are often desirable in log walls to accommodate windows, doors, and the like. It may be advantageous to provide special support structures at such openings to facilitate building the walls around the opening, and to provide a suitable mounting means for the structural framing elements of the window or door to be subsequently installed. A known opening support structure is disclosed in U.S. Pat. No. 4,224,772 (Bene et al.). Bene et al. discloses a connection member disposed between the log end faces at the opening and the frame member of a window to be installed in the opening. The connection member is attached to the logs by nails driven through slots in the connection member and into the end grain of the logs, so that relative vertical movement between the connection member and the logs is possible. The frame member of the window is in turn secured to the connection member. Using nails driven into the end grain of the logs may not, however, provide a secure joint because the nails may work loose as the fibers of the wood separate. Furthermore, shrinkage of the logs over time may compromise the strength of the support structure.

In building log walls, the logs themselves can be provided with a particular profile to facilitate alignment of the logs during construction and to increase the strength of the wall. In the above-noted Wrightman patent, a log profile is disclosed in which the tongues and grooves are provided in the upper and lower surfaces of the logs, respectively. The upper and lower surfaces of vertically adjacent logs fit together, providing a seam across the width of the logs. However, at either side of the logs, the profile provides a generally horizontal seam portion which could collect moisture and cause associated wood preservation difficulties.

Another log profile is disclosed in U.S. Pat. No. 3,440,784 (Onjukka). The profile taught by Onjukka has matching tongues and grooves in the upper and lower surfaces of vertically adjacent logs. However, no provision is made for installing seals along the seam between adjacent logs, at a point along the seam between the outer horizontal edges. Accordingly, the weather-proofing of the interface between adjacent logs may be compromised, particularly as the logs shrink and settle over time.

In some log structures having walls constructed of stacked horizontal logs, it can be advantageous to provide vertical posts at the corners of intersecting walls, as well as at intermediate points along the length of a wall. A post-to-log connection structure can be provided for connecting the end faces of the logs to a vertical surface along the post. A known post-to-log connection structure is disclosed in U.S. Pat. No. 4,742,033 (Veech), wherein a vertical spline is inserted into corresponding slots provided in the end faces of the logs and the surface of the post. However, no adjustable fastening means is provided for drawing the post and log ends snugly together.

SUMMARY OF THE INVENTION

The present invention is directed to an improved construction system for constructing log structures. The system provides a corner connection structure, a through-bolt clamping apparatus, logs with a particular log profile, an opening support structure, an exterior casing structure, and a butt-joint connection structure and a log-to-post connection structure.

According to a first aspect of the invention, a corner connection structure is provided at the intersection of first and second walls constructed of stacked horizontal logs. The corner connection structure has overlap portions provided adjacent the ends of intersecting logs, wherein the overlap portions of the logs of a first wall are alternately interlaced with the overlap portions of the logs of a second wall. The overlap portions of adjacent logs have a geometrical configuration shaped to interlock with each other. The corner connection structure has a generally vertical slot extending through the overlap portions of the logs, and at least one spline shaped to fit in the slot. The geometrical configuration can be a dovetail.

The slot of the corner connection structure can be formed by grooves in each log, the groove of one log positioned to cooperate with the grooves of adjacent logs to form the slot. Each groove can have an open vertical edge along the overlap portion of each log and an opposed closed vertical edge within the log cross-section adjacent the overlap portion.

The spline may have a plate portion and a locking rib extending therefrom, the locking rib having a thickness extending transversely from the spline. The slot may have a corresponding transversely extending rib recess for receiving the locking rib. The locking rib may be oriented generally vertically, and the plate portion of the spline can extend horizontally outwardly from either side of the locking rib. The locking rib may have an outer surface, which in cross-section provides interspersed contact areas and non-contact areas with the inner surface of the rib recess.

The rib recess may be a generally cylindrical bore positioned adjacent the slot. The cylindrical bore may be positioned towards the outer sidewall of the slot, and be tangentially intersected by the slot. The outer surface of the rib may be polygonal having a plurality of vertices, the vertices providing the contact areas with the inner surface of the cylindrical bore.

The corner connection structure may have a generally vertical bolt cavity extending through the overlap portions of the logs of the intersecting walls, and may further be provided with a through-bolt clamping apparatus. In one embodiment, the through-bolt clamping apparatus has a through-bolt extending through the bolt cavity, a lower clamp arm coupled to the through-bolt and the bottom of the intersecting walls, and an upper clamp arm coupled to the through bolt and the top of the intersecting walls. The bolt cavity may be provided substantially within the locking rib of the spline.

At least one of the upper and lower clamp arms may be a transfer bar, the transfer bar having spaced apart first and second contact pads. The first contact pad may engage the first intersecting wall at a position spaced horizontally away from the corner joint area, and the second contact pad may engage the second wall at a position spaced horizontally away from the corner joint area, the corner joint area being defined as the stacked overlap portions of the intersecting logs.

An anti-rotate coupling device may be provided to couple the lower clamp arm to the through-bolt. The anti-rotate coupling device may be an elongate hex-nut, and the bolt cavity may have an inner surface that is hexagonal in cross-section and is shaped to slidingly receive the elongate hex-nut.

According to a second aspect of the present invention, a through-bolt clamping apparatus for bracing a wall constructed of stacked horizontal logs is provided. The through-bolt clamping apparatus has a through bolt that is oriented generally vertically and spans the height of the wall. The through-bolt clamping apparatus also has a lower clamp arm coupled to the through-bolt and the bottom of the intersecting walls, and an upper clamp arm coupled to the through bolt and the top of the intersecting walls.

In one embodiment, the through-bolt clamping apparatus includes a generally vertical bolt cavity extending through the logs of the wall and adapted to receive the through-bolt. At least one of the upper and lower clamp arms is a transfer bar, the transfer bar having spaced-apart first and second contact pads. The first contact pad engages the first intersecting wall at a position spaced horizontally away from the corner joint area, and the second contact pad engages the second wall at a position spaced horizontally away from the corner joint area, the corner joint area being defined as the stacked overlap portions of the intersecting logs.

An anti-rotate coupling device may be provided to couple the lower clamp arm to the through-bolt. The anti-rotate coupling device may include an elongate hex-nut, and the bolt cavity can have a corresponding inner surface that is hexagonal in cross-section and is shaped to slidingly receive the elongate hex-nut.

Alternatively, the anti-rotate coupling device may have a coupling sleeve coupled to the through-bolt, a locking pin having ends projecting outwardly from the sleeve, and a generally horizontal lock bore provided in the wall and intersecting the bolt cavity, wherein the outwardly projecting ends of the locking pin are adapted to engage the lock bore to prevent rotation of the coupling sleeve.

Alternatively, the anti-rotate coupling device may have a clamp arm recess provided in a lowermost log of the wall, the clamp arm recess having side walls spaced apart to receive the clamp arm and adapted to engage a surface of the clamp arm to prevent rotation of the clamp arm within the clamp arm recess.

According to a third aspect of the present invention, an opening support structure is provided at an opening in a wall constructed of stacked courses of horizontal logs. The opening support structure has connectors positioned within the wall adjacent the opening for connecting together two vertically adjacent logs. The connectors have a connector body with lower and upper log engagement portions, wherein the lower engagement portion engages a log in one course, and the upper engagement portion engages a log in a course vertically above the log engaged by the lower log engagement portion.

The logs adjacent the opening may have top surfaces provided with upper connector apertures adapted to receive the lower log engagement portions of the connectors, and bottom surfaces provided with lower connector apertures adapted to receive the upper log engagement portions of the connectors.

In one embodiment, the connectors are further provided between the logs in the courses of logs interrupted by the opening and the logs in the courses of logs immediately above and below the interrupted logs.

The outer profile of the connectors may be adapted to provide interspersed areas of contact and areas of non-contact between the outer surface of the connectors and the inner surface of the connector apertures.

The opening support structure may have sub-jamb members provided adjacent the vertical sides of the opening, each sub-jamb member having vertically elongate slots along its length, and fastener access passageways extending through the wall between the slots of the sub-jamb members and the connectors. Fasteners may extend through the elongate slots of the sub-jamb members and the fastener access passageways. The fasteners may be coupled to the connectors and to the sub-jamb members, and may be adjusted to draw the sub-jamb members snugly against the sides of the opening.

In one embodiment, the fastener comprises a bolt with a threaded portion, and the connectors are provided with a generally horizontal internally threaded bore adapted to engage with the threaded portion of the bolt. Opposed depressions can be provided in the top and bottom surfaces of the logs, the depressions adapted to cooperate to form the fastener access passageways. The opposed depressions can be v-grooves.

The connectors may be provided with an alignment pin positioned vertically adjacent to and parallel with the internally threaded bore, and the v-grooves may provide converging portions adapted to interact with the alignment pin to provide vertical and rotational alignment of the internally threaded bore with the fastener access passageways.

In a fourth aspect of the invention, a butt joint connection structure is provided between first and second horizontally adjacent logs in wall constructed of logs so that the logs may be joined end-to-end. The butt joint connection structure has a generally vertical spline slot extending across the seam between the end faces of the first and second logs, the spline slot formed by the cooperation of a vertically oriented spline groove provided in each of the adjacent end faces of the first and second logs, the spline grooves having opposed sidewalls extending generally parallel with the wall.

The butt joint connection structure has a spline shaped to fit into the spline slot, the spline having a plurality of vertically oriented recesses, each recess having an elongate open face adjacent said sidewalls of said spline grooves. Fasteners may be provided in each recess, the fasteners having a cross-sectional area that exceeds the cross-sectional area of the recesses, wherein a depression is created in said sidewall opposite said recess.

The butt joint connection structure may have a butt joint sealing structure, the sealing structure having a generally vertical seal slot extending across the seam between the end faces of the first second logs, the seal slot formed by the cooperation of vertically oriented seal grooves provided in each of the adjacent end faces of the first and second logs, the seal grooves having opposed sidewalls extending generally parallel with the wall. A seal assembly may be provided in the seal slot, the seal assembly having at least one stiffening portion of non-buckling material adhered to a sealing element of resilient weather proofing material.

The seal assembly may have two stiffening portions adhered to opposite sides of the sealing element. The seal assembly may have a relaxed state and a compressed state, such that the seal assembly must be manipulated into the compressed state for insertion into the seal slot.

According to a fifth aspect of the invention, a log profile is provided for each of a plurality of logs stacked to form a log wall. The log profile has opposed, generally vertical, side surfaces; a top surface extending between the side surfaces, the top surface having an upwardly directed tongue adjacent each side surface; a bottom surface opposite the top surface, the bottom surface having upwardly directed grooves shaped to receive the tongues of an adjacent log; and a pair of spaced apart seal recesses provided in one of the upper surface and lower surface of the log for receiving a sealant. The portion of the top surface of the log from either side surface of the log to the adjacent seal recess consists of one or more upwardly inclined surfaces.

The log profile may have an elongate depression positioned substantially centrally along at least one of the top surface and bottom surface of the log, whereby elongate passageways are provided between adjacent logs. The depressions may be opposed v-grooves provided in the top surface and bottom surface of the logs.

In a sixth aspect of the invention, an exterior side casing structure for an opening provided in a wall constructed of stacked horizontal walls is provided. The opening may have an opening support structure including sub-jamb members along either vertical side of the opening, the sub-jamb members accommodating relative vertical movement between the logs and the sub-jamb members. The side casing structure may have a vertical casing member extending along either vertical side of the opening, the casing member having a rear face adjacent the logs and the sub-jamb member along each side of the opening, and a width which spans the interface between the logs and the sub-jamb member.

A channel may be provided in the rear face of the casing member, the channel extending vertically along the length of the casing member, and the channel having a width which spans the interface between the logs and the sub-jamb member. A mounting base may be provided along the rear face of the casing member, the mounting base being fixed to the sub-jamb member.

According to a seventh aspect of the present invention, a post-to-log connection structure for connecting stacked horizontal logs of a log wall to a vertical post is provided. The post-to-log connection structure has a bracket coupled to the post, wherein the bracket is vertically slidable relative to the post, a connector positioned within the wall adjacent the post, a fastener access passageway extending through the wall between the bracket and the connector, and a fastener extending through the fastener access passageway, wherein the fastener is coupled to the bracket and to the connector, and is adjustable to draw the logs snugly against the post.

The connector of the post-to-log connection structure may have a connector body with lower and upper log engagement portions, wherein the lower engagement portion engages a log in one course, and the upper engagement portion engages a log in a course vertically above the log engaged by the lower log engagement portion.

The logs adjacent the post may have top surfaces provided with upper connector apertures adapted to receive the lower log engagement portions of the connectors, and bottom surfaces provided with lower connector apertures adapted to receive the upper log engagement portions of the connectors. The outer profiles of the connectors may be adapted to provide interspersed areas of contact and areas of non-contact between the outer surface of the connectors and the inner surface of the connector apertures.

Each fastener of the post-to-log connection structure may be a bolt having at opposite ends a head and a threaded portion, and the connectors may be provided with a generally horizontal bore shaped to engage with the head of the bolt. A hex nut may be coupled with the threaded portion of the bolt, and a locking pin may extend transversely from the nut and engage the bracket.

Opposed depressions may be provided in the top and bottom surfaces of the logs, the depressions adapted to cooperate to form the fastener access passageways. The opposed depressions may be v-grooves. The post of the post-to-log connection structure may be provided with a generally vertical channel abutting the logs, and the bracket may be vertically slidable within the channel. The channel may have generally transverse retaining lips, and the bracket may have clamp arms in engagement with the retaining lips.

The clamp arms of the brackets may be obliquely aligned flange members, wherein the spacing between the flange members converges from a wider spacing away from the connectors, to a narrower spacing nearer the connectors. The retaining lips may have obliquely aligned contact surfaces for providing generally flush contact with the flange members of the bracket.

BRIEF DESCRIPTION OF THE DRAWINGS

For a better understanding of the present invention and to show more clearly how it would be carried into effect, reference will now be made by way of example, to the accompanying drawings that show a preferred embodiment of the present invention, and in which:

FIG. 3b is an end view of the portion of the log shown in FIG. 3a;

FIG. 9a is a perspective view of a corner spline according the present invention;

FIG. 9b is a side view of the spline of FIG. 9a;

FIG. 11 is a perspective view of an alternative embodiment of a corner spline for use with the corner connection structure of the present invention;

FIG. 17 is a front elevation view of another embodiment of a through-bolt clamping apparatus according to the present invention;

FIG. 18 is an exploded view of the apparatus of FIG. 17;

FIG. 19 is a side elevation view of the apparatus of FIG. 17;

FIG. 22 is a cross-sectional view of the log profile of FIG. 1;

FIG. 23 is a cross-sectional view of one log of FIG. 22 stacked upon another;

FIG. 27 is a perspective view showing a portion of the structure of FIG. 26 in further detail;

FIG. 28a is a side view of a support block of FIG. 27;

FIG. 28b is a side view of another support block of FIG. 27;

FIG. 38 is a top view of portions of the butt joint connection structure of FIG. 1;

FIG. 39 is a top view of a spline of the butt joint connection structure of FIG. 1;

DETAILED DESCRIPTION OF THE INVENTION

Figure 1:
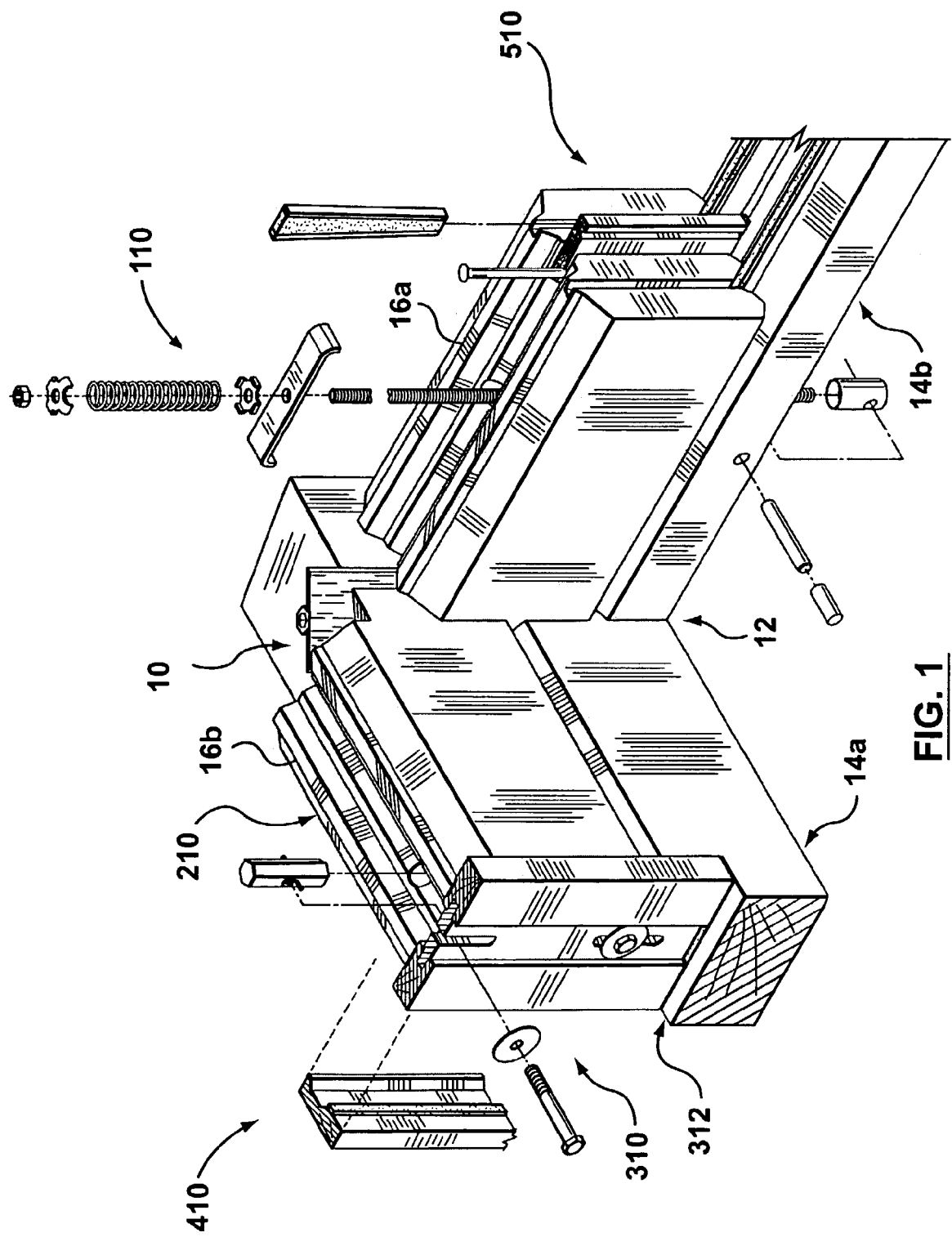
FIG. 1 is a perspective view of a portion of two intersecting walls having, in accordance with the present invention, a corner connection structure, a through-bolt clamping apparatus, logs with a particular log profile, an opening support structure, an exterior casing structure, and a butt-joint connection structure.

A corner connection structure according to the present invention is shown generally at 10 in FIG. 1. The corner connection structure 10 is provided at a corner 12 where walls 14a and 14b intersect. The walls 14a and 14b form part of a building such as, for example, but not limited to, a home or cabin.

Figure 2:
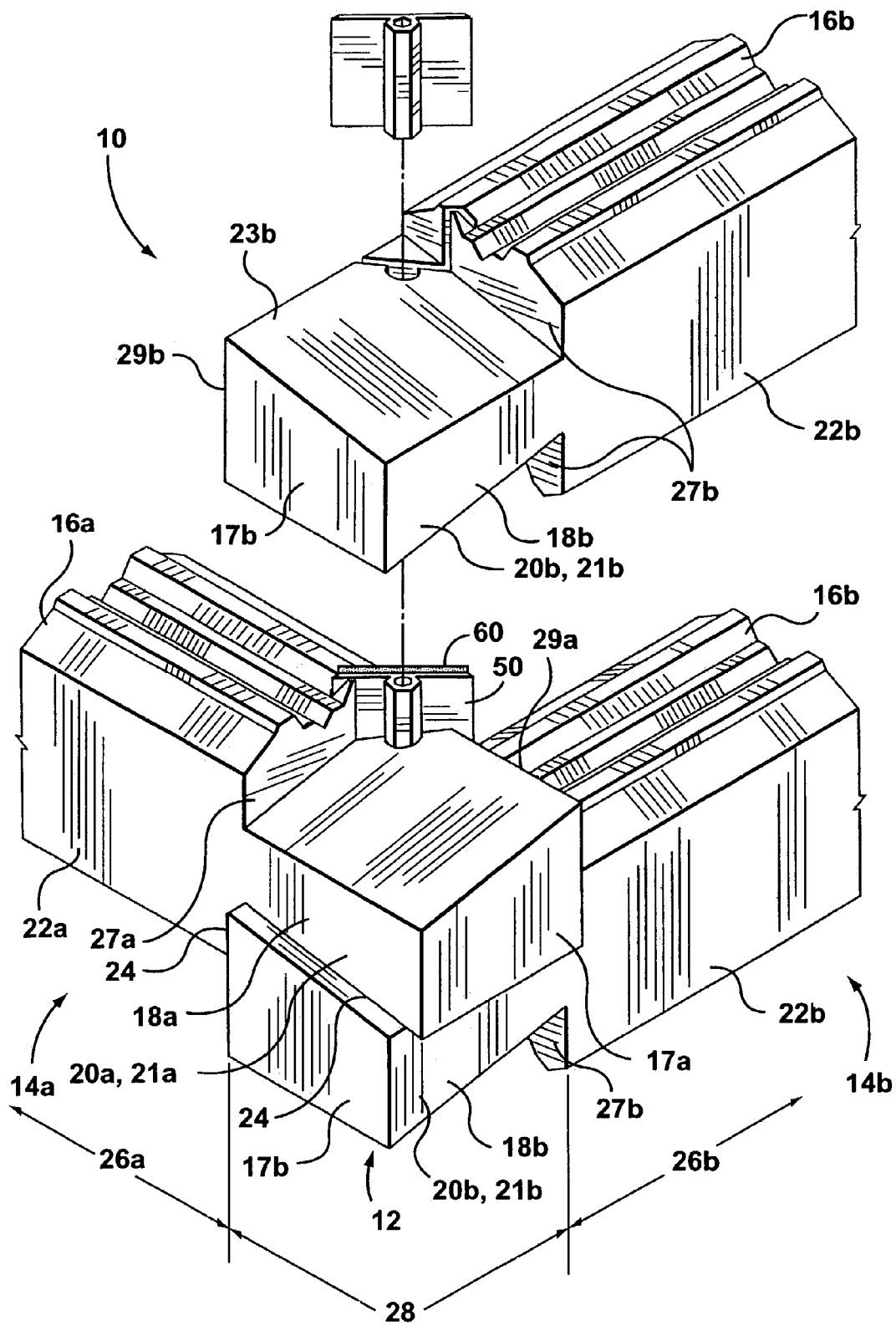
FIG. 2 is a perspective view showing the corner connection structure of FIG. 1 in greater detail.

Referring to FIG. 2, the walls 14a and 14b are constructed of generally horizontally extending logs 16a and 16b, respectively. The walls 14a and 14b are nonparallel, intersecting each other at the corner 12. In the embodiment illustrated, the walls 14a and 14b intersect at approximately 90°. However, the angle of intersection at corner 12 could be any angle, and it is to be appreciated that the corner connection structure 10 could be used on walls having any angle of intersection, and also on walls meeting at a T-intersection.

The logs 16a and 16b of the walls 14a and 14b have ends 17a and 17b which are proximate the corner 12. Adjacent the ends 17a and 17b, the logs 16a and 16b are provided with overlap portions 18a and 18b, respectively, which overlap each other in an alternating interlaced arrangement at the corner 12. The logs 16a, 16b have non-overlapping portions 22a, 22b adjacent the overlap portions 18a, 18b, respectively.

Preferably, the overlap portions 18a, 18b of the logs 16a, 16b have a geometrical configuration 20a, 20b, which is shaped so that the overlap portions 18a, 18b of adjacent logs 16a, 16b fit together at the corner 12 in an interlocking arrangement. The geometrical configuration 20a, 20b can include cut-outs as commonly provided in saddle-notch corners, butt-and-pass corners, and in dovetail corner construction.

Figure 3B:
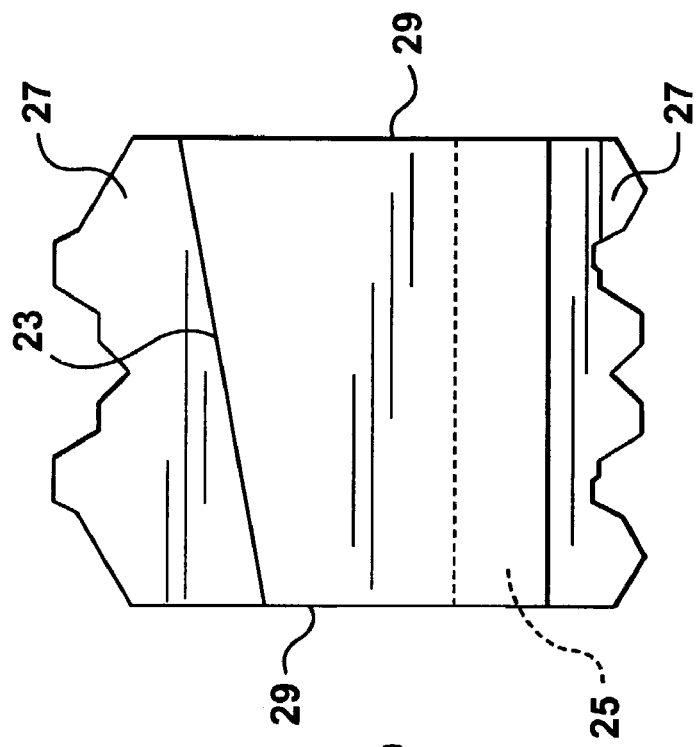
Figure 3A:
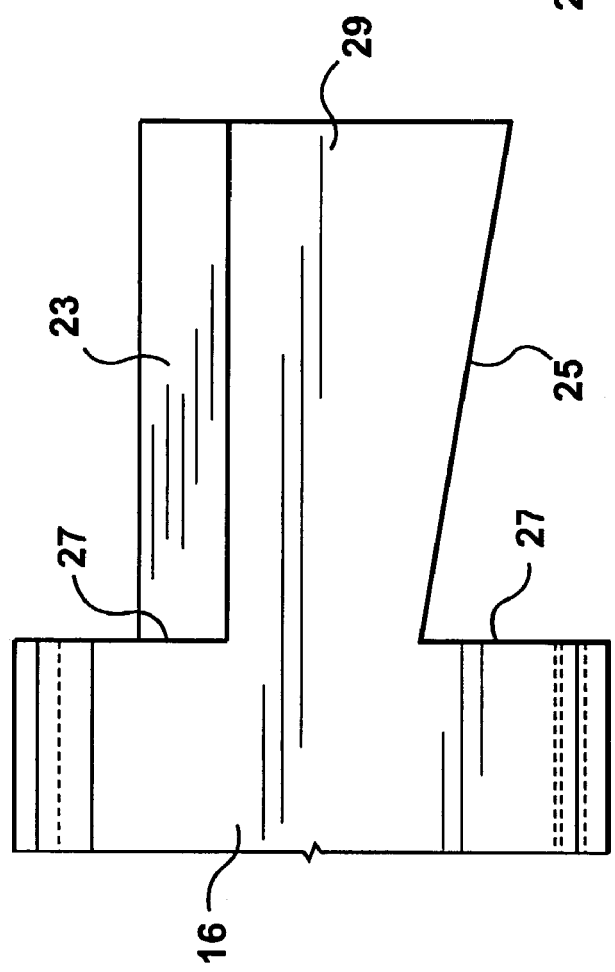
FIG. 3a is side view of a portion of a log used in the connection structure of FIG. 2.

In the embodiment illustrated (FIGS. 2 and 3), the geometrical configurations 20a, 20b, comprise dovetails 21a, 21b milled into the overlap portions 18a, 18b of the logs 16a, 16b. Each dovetail 21 has a generally planer upper surface 23 and lower surface 25, both of which are inclined to the horizontal. Generally vertical shoulder surfaces 27 extend upward and downward from the upper and lower surfaces 23 and 25 of the dovetail 21, respectively, along the non-overlapping portions 22 of the logs 16. Each dovetail 21 also has a generally vertical side face 29, extending between the upper and lower surfaces 23 and 25.

Referring again to FIG. 2, the mating surfaces of adjacent dovetails 21 at the corner 12 define corner joint interfaces 24. More particularly, the upper and lower surfaces 23 and 25 of adjacent dovetails 21 lie generally flush against each other defining generally horizontal (although inclined) corner joint interfaces. As well, the shoulder surfaces 27 lie generally flush against the side faces 29 of the adjacent dovetails 21, defining generally vertical corner joint interfaces.

Figure 4:
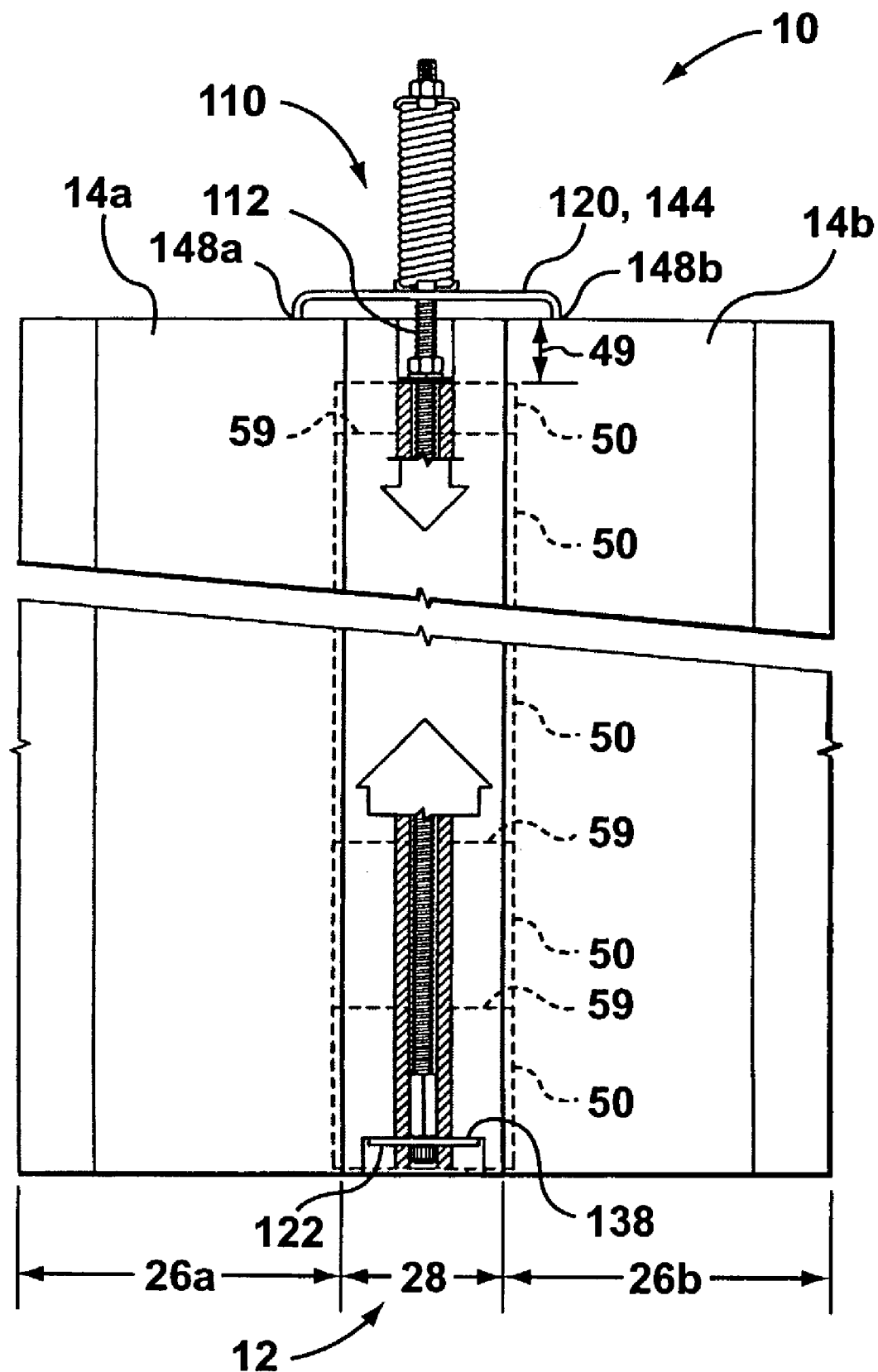
FIG. 4 is an elevation view of the corner connection structure of FIG. 1, in combination with a through-bolt clamping apparatus.

Referring now to FIGS. 2 and 4, the wall 14a has a distinct wall section 26a in which the non-overlapping portions 22a of the logs 16a are vertically adjacent each other. Similarly, the wall 14b has a distinct wall section 26b in which the non-overlapping portions 22b of the logs 16b are vertically adjacent each other.

The area between the distinct wall sections 26a and 26b of the intersecting walls 14a and 14b is defined as the corner joint area 28. The corner joint area 28 is characterized as an area of the intersecting walls 14a and 14b in which the overlapping portions 18a and 18b of the logs 16a and 16b overlap each other in an alternating, interlaced arrangement.

Figure 5:
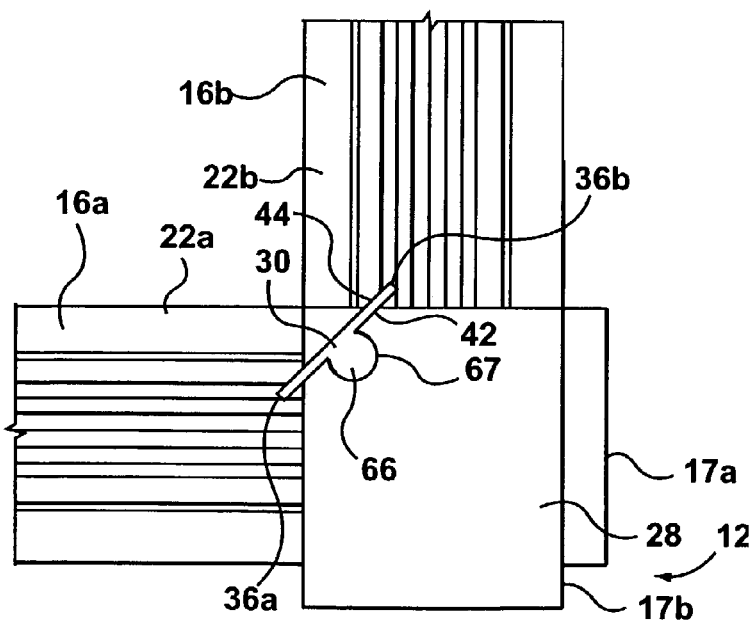
FIG. 5 is a top view of two logs of the corner connection structure of FIG. 1.

Referring to FIG. 5, the corner connection structure 10 is further provided with a slot 30 that extends, in the horizontal, obliquely across the corner joint area 28 of the intersecting walls 14a, 14b. The slot 30 extends, in the vertical, along substantially the entire height of the walls 14a, 14b at the corner 12.

Figure 6:
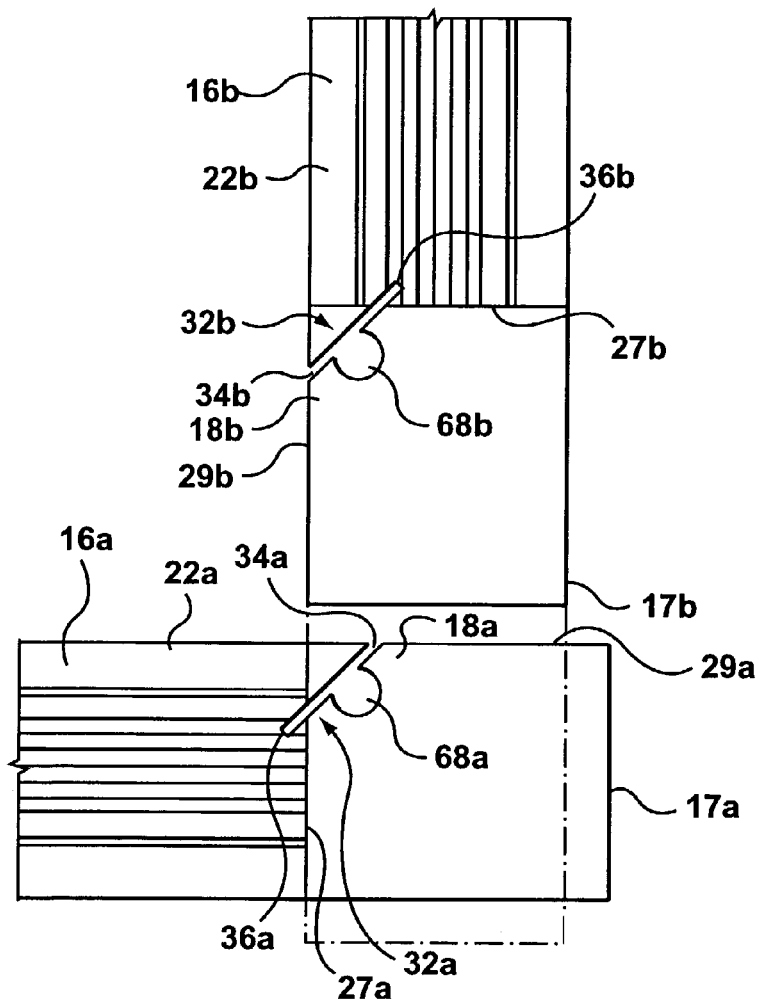
FIG. 6 is an exploded view of the logs shown in FIG. 5.

As best seen in FIG. 6, vertically aligned grooves 32a, 32b are provided in the logs 16a, 16b. The grooves 32a, 32b cooperate to form the slot 30 in the corner connection structure 10. More specifically, each log 16a, 16b is provided with a groove 32a, 32b that extends vertically through the height of the log 16, and extends horizontally in a direction which is oblique to the longitudinal axis of the log 16.

The particular angle between the grooves 32a, 32b and the horizontal axis of the corresponding logs 16a, 16b can conveniently be selected to be generally equal to each other. The slot 30 formed by the cooperating grooves 32a, 32b is thereby generally perpendicular to a line bisecting the included angle between the intersecting walls 14a and 14b. In the embodiment illustrated, the walls 14a, 14b intersect at 90°, and the grooves 32a, 32b are oriented at about 45° relative to the corresponding longitudinal axes of the logs 16a, 16b.

Further details of the grooves 32 will now be described, with reference to FIG. 7. Each groove 32 in the logs 16 has an open vertical edge 34 positioned along the log 16 to abut the overlap portion 18. In other words, the log material on either side of the open vertical edge 34 of the groove 32 is part of the overlap portion 18 of the log 16. The groove 32 extends horizontally to a closed vertical edge 36, which is positioned within the adjacent non-overlapping portion 22 of the log 16.

In logs 16 having overlap portions 18 with geometrical configurations 20, the height of the log 16 will generally not be constant along the length of the groove 32. For example, in the embodiment illustrated having dovetails 21, the height of the log 16 has a step at the shoulder surface 27. The intersection of the groove 32 and the shoulder surface 27 defines a threshold 33 within the groove 32.

Figure 7:
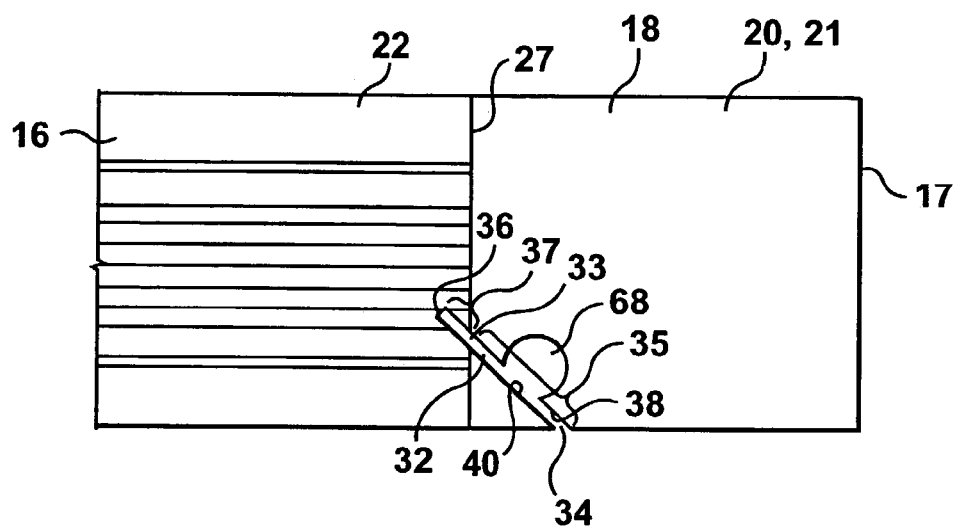
FIG. 7 is an enlarged view of one of the logs shown in FIG. 6.

As best seen in FIG. 7, each groove 32 has an interstacking portion 35 which extends within the overlap portion 18 of the log 16. In the embodiment illustrated, the interstacking portion 35 of the groove 32 extends from the open vertical edge 34 to the threshold 33. Each groove 32 also has a non-interstacking portion 37 extending within the non-overlap portion 22 of the log 16. In the embodiment illustrated, the non-interstacking portion 37 of the groove 32 extends from the threshold 33 to the closed vertical edge 36.

The side surfaces of the groove extending between the open edge and the closed edge define an outer side surface 38 facing towards the end 17 of the log 16 proximate the corner 12, and an inner side surface 40 opposite the outer side surface 38.

As mentioned above, the grooves 32 of vertically adjacent logs 16 at the corner 12 cooperate to form the slot 30. More specifically, the overlap portions 18a of the logs 16a of the first wall 14a and the overlap portions 18b of the logs 16b of the second wall 14b overlap each other in an alternating, interlaced arrangement at the corner 12 (FIG. 2). The interstacking portions 35a and 35b of the grooves 32a and 32b therefore also overlap in an alternating fashion. The grooves 32a and 32b are positioned in the logs 16a and 16b of the walls 14a, 14b, so that the outer side surfaces 38a, 38b of the grooves 32a, 32b of vertically adjacent logs 16a, 16b are substantially coplanar, providing a generally continuous outer sidewall 42 of the slot 30 (FIGS. 5 and 6). Similarly, the inner side surfaces 40a, 40b of the grooves 32a, 32b of vertically adjacent logs 16a, 16b are in substantially coplanar alignment, forming a generally continuous inner sidewall 44 of the slot 30.

The non-interstacking portions 37a, 37b of the grooves 32a, 32b provided in logs 16a, 16b do not overlap each other in an alternating, interlaced arrangement. The non-interstacking portions 37a are vertically adjacent other non-interstacking portions 37a, and the non-interstacking portions 37b of the grooves 32b of logs 16b are vertically adjacent other non-interstacking portions 37b.

The open vertical edges 34a of the grooves 32a in the logs 16a generally adjoin the grooves 32b where the grooves 32b cut through the shoulder surfaces 27b of adjacent logs 16b. In other words, the open vertical edges 34a of the grooves 32a are vertically aligned with the thresholds 33b of the grooves 32b in the adjacent logs 16b. Similarly, the open vertical edges 34b of the grooves 32b in the logs 16b generally adjoin the grooves 32a where the grooves 32a cut through the shoulder surfaces 27a of the adjacent logs 16a. This alignment of the grooves 32a and 32b forms the slot 30, extending between generally continuous vertical edges 36a and 36b, and inner and outer sidewalls 44 and 42.

It is to be appreciated by one skilled in the art that logs used to construct log homes typically do not have a vertically symmetrical cross-sectional profile, but rather, the logs often have distinct upper surface and lower surface profiles. Accordingly, the logs of the first wall 14a and the logs of the second wall 14b have grooves 32a, 32b which are mirror image to each other, rather than identical to each other. Further details of log profiles according to the present invention will be discussed subsequently.

Figure 8:
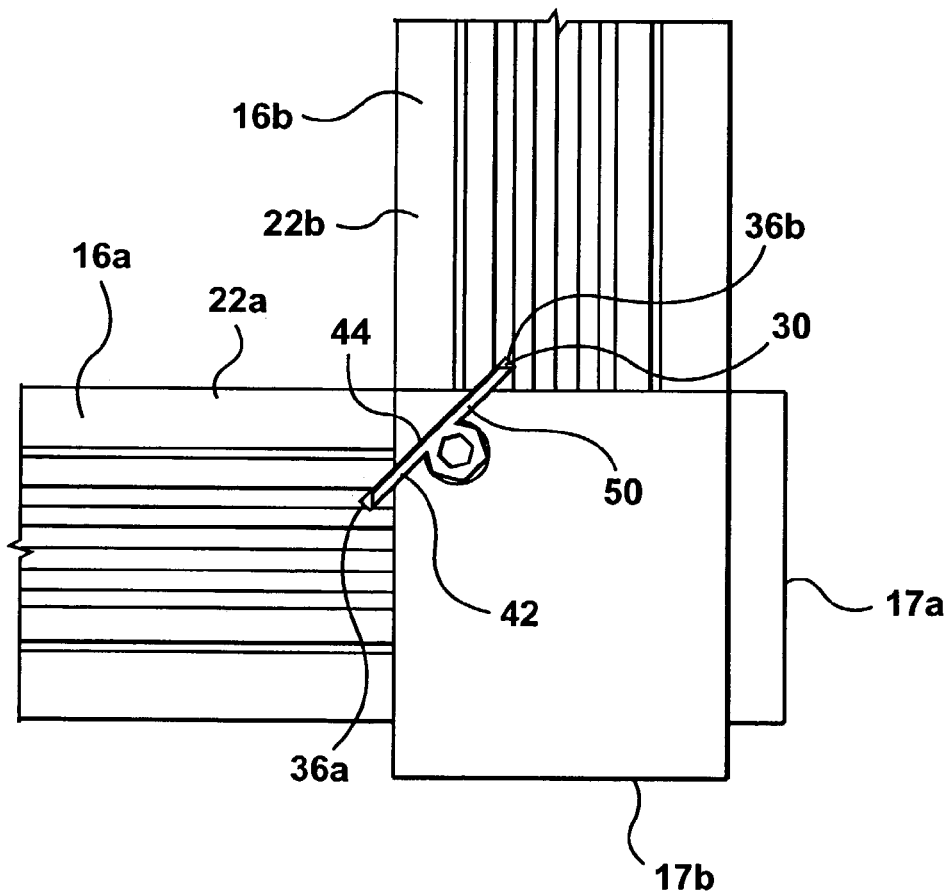
FIG. 8 shows the logs of the corner connection structure of FIG. 5 in combination with a corner spline according to the present invention.

As seen in FIG. 2 the corner connection structure 10 is further provided with a spline 50, which is adapted to fit snugly in the slot 30. Referring to FIGS. 8, 9a and 9b, the spline 50 has a horizontal width 52 which extends substantially all the way across the width of the slot 30, between the opposed vertical edges 36a and 36b. The spline 50 has a thickness 54 which is small enough to allow the spline 50 to be inserted in the slot 30, but is preferably large enough to provide upper and lower horizontal edge surfaces 56 which facilitate stacking of the splines 50 upon one another in the slot 30. In the embodiment illustrated in FIG. 9a, the spline 50 has a plate portion 58 that extends between opposed vertical edges 57 and between upper and lower horizontal edges 56. The plate portion 58 of the spline 50 has a thickness 54 which is slightly less than the space between the sidewalls 44 and 42 of the slot 30, and a width 52 which is slightly less than the space between the edges 36a, 36b of the slot 30.

The height 55 of the spine 50 can be any height which is convenient for the assembly of the corner connection structure 10. As best seen in FIG. 4, the stacked spines 50 extend almost the entire height of the walls 14a, 14b at the corner 12. The upper edge 56 of the uppermost spline 50 is spaced below the tops of the walls 14a, 14b to provide a settling gap 49.

In the embodiment illustrated, a typical spine 50 is shown having a height approximately equal to the height of the logs 16a, 16b used to construct the walls 14a, 14b. The stacking of the spines 50 produces seams 59 between the upper and lower horizontal edge surfaces 56 of vertically adjacent spline 50.

The height 55 of the splines 50 in the corner connection structure need not be uniform, and the height of some splines 50 can be increased to advantageously reduce the number of splines 50, and hence the number of seams 59 between adjacent splines 50, at the corner 12. Reducing the number seams 59 reduces the number of potential gaps through which drafts and moisture can pass.

The splines 50 can be constructed of any suitable material, such as, but not limited to, steel, aluminum, or polymer material. The splines 50 may advantageously be cut to the desired height from a length of extruded material.

As each log 16 is laid down at the corner 12, a spline 50 is inserted into the slot 30, and pressed snugly against the previously installed spline 50. This ensures that the grooves 32a, 32b are properly aligned to extend the slot 30 as successive logs 16 are installed, and also provides stability of the logs 16 as the walls 14a, 14b are being built.

Figure 10:
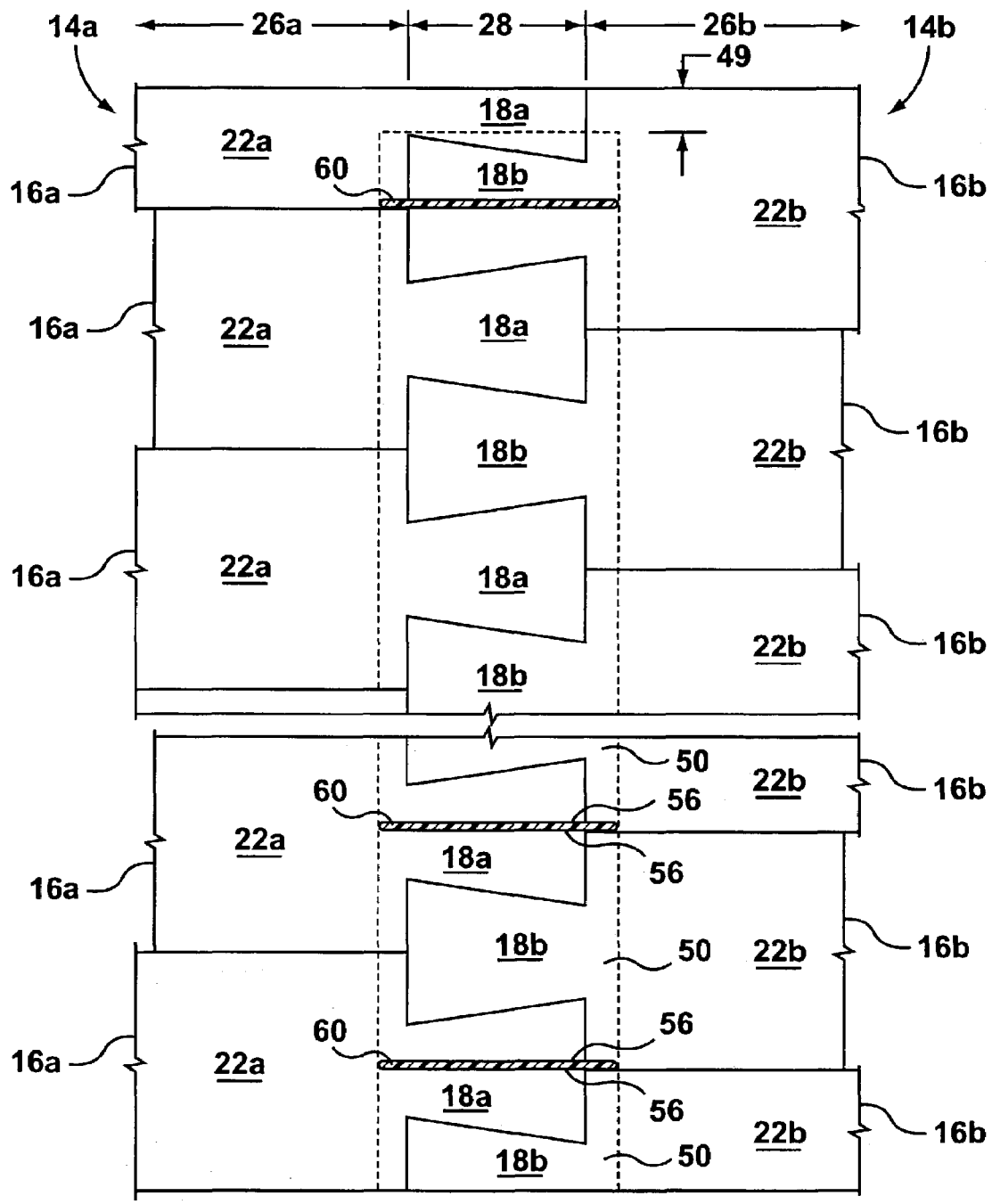
FIG. 10 is an elevation view of an alternative embodiment of a corner spline for use with the corner connection structure of the present invention.

As best seen in FIG. 10, the spines 50 simultaneously block off the joint interfaces 24 between the overlap portions 18a, 18b of the adjacent logs 16a, 16b of the corner 12. In particular, the generally horizontal joint interfaces between the upper and lower surfaces 23 and 25 of adjacent dovetails 21, as well as the generally vertical joint interfaces between the shoulder surfaces 27 and the adjacent side faces 29 of adjacent dovetails 21 are sealed against weather intrusion by the spline 50. This advantageously eliminates the need for gaskets or caulking between the mating joint interface surfaces 24 at the corner 12.

To further enhance the weather-proofing characteristics of the corner connection structure 10, the vertical position of the seams 59 between vertically adjacent splines 50 can be adjusted so that the seams 59 intersect with the joint interfaces 24 as few times as possible. In the embodiment illustrated, having geometrical configurations 20 comprising dovetails 21, the seams 59 are positioned at approximately the vertical midpoint of the dovetail 21 of any single log 16a or 16b.

Furthermore, a sealant 60 can be provided between the upper and lower edge surfaces 56 of adjacent splines 50 to enhance the weatherproofing characteristics of the corner connection structure 10. The sealant 60 can be, for example, but not limited to, a strip of asphalt-impregnated sealant tape.

Referring again to FIGS. 8, 9, and 10, the spline 50 can be provided with a locking rib 62 having a thickness 64 which extends transversely from the plate portion 58 of the spline 50. In the embodiment illustrated in FIG. 8 and 9, the rib thickness 64 extends from the outer surface of the spline, and the rib is oriented generally vertically along the outer surface of the spline, at about an equal distance from the opposed vertical side edges 57 of the plate portion 58 of the spline 50.

The locking rib 62 enhances the corner connection structure 10 by preventing horizontal movement of the logs relative to one another in a direction parallel to the plate portion 58 of the spline 50. Furthermore, the rib 62 provides a fixed point towards which the log 16 will draw as it dries and shrinks over time. By providing a single point towards which the logs 16 in the walls 14 will shrink, a tighter, stronger joint is generated over time.

To accommodate the rib 62, the slot 30 is provided with a generally continuous rib recess 66 (FIG. 5). In the embodiment illustrated, the rib recess 66 comprises a generally cylindrical bore 67 positioned adjacent the outer sidewall 42 of the slot 30. The cylindrical bore 67 has a diameter tangentially intersected by the slot 30.

To form the rib recess 66, pockets 68a, 68b are provided along the grooves 32a, 32b in the logs 16a, 16b (FIG. 6). The pockets 68a, 68b overlap in alternating arrangement at corner 12, and are positioned to be in vertical alignment, thereby forming the rib recess 66.

Figure 8A:
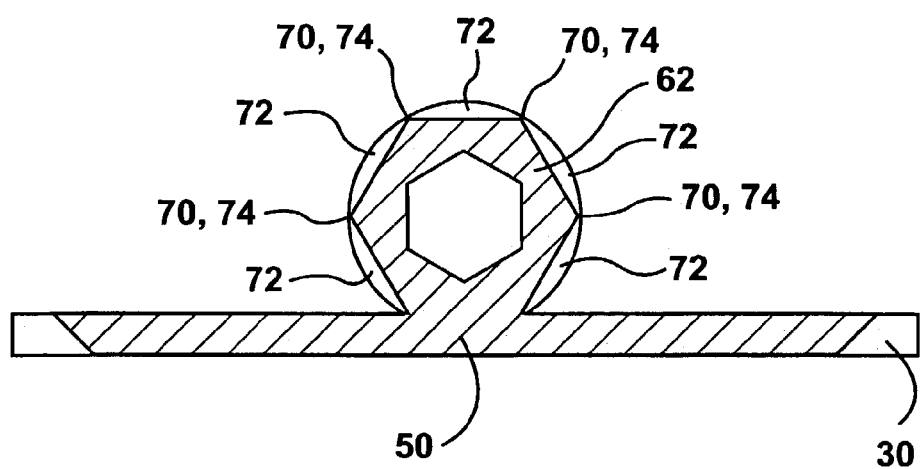
FIG. 8a is an enlarged view of a portion of FIG. 8.

Referring to FIG. 8a, the cross-sectional profile of the outer surface of the rib 62 can be shaped to cooperate with the inner surface of the rib recess 66 so that areas of contact 70 between the rib 62 and the rib recess 66 are interspersed with areas of non-contact 72. In the embodiment illustrated, the rib 62 has an outer surface which is polygonal having a plurality of vertices 74, and the inner surface of the rib recess 66 is generally cylindrical. The vertices 74 of the outer surface of the rib 62 are sized to have a slight interference fit with the inner surface of the rib recess 66. This provides good holding contact, while also reducing the chances of binding in the vertical direction. This is considered advantageous because relative movement between the splines and the logs in the vertical direction is desirable to accommodate natural settling of the logs over time.

An alternative spline 80 is illustrated in FIG. 11. The spline 80 is similar to the spline 50, having a plate portion 58 and a rib 62. However, in the spline 80, the plate portion 58 is comprised of two distinct plate portion segments 82 and 84, each of which extends contiguously in opposite directions from the rib 62. In the embodiment illustrated, a gap 86 separates the plate portion segments 82, 84, and the gap 86 is positioned adjacent the rib 62.

Through-Bolt System

The corner connection structure 10 can further be provided with a through-bolt clamping apparatus shown generally at 110 in FIGS. 1 and 4. The through-bolt clamping apparatus 110 has a through-bolt 112 that extends generally vertically through the plurality of courses of logs 16 forming the walls 14a, 14b.

Figure 12:
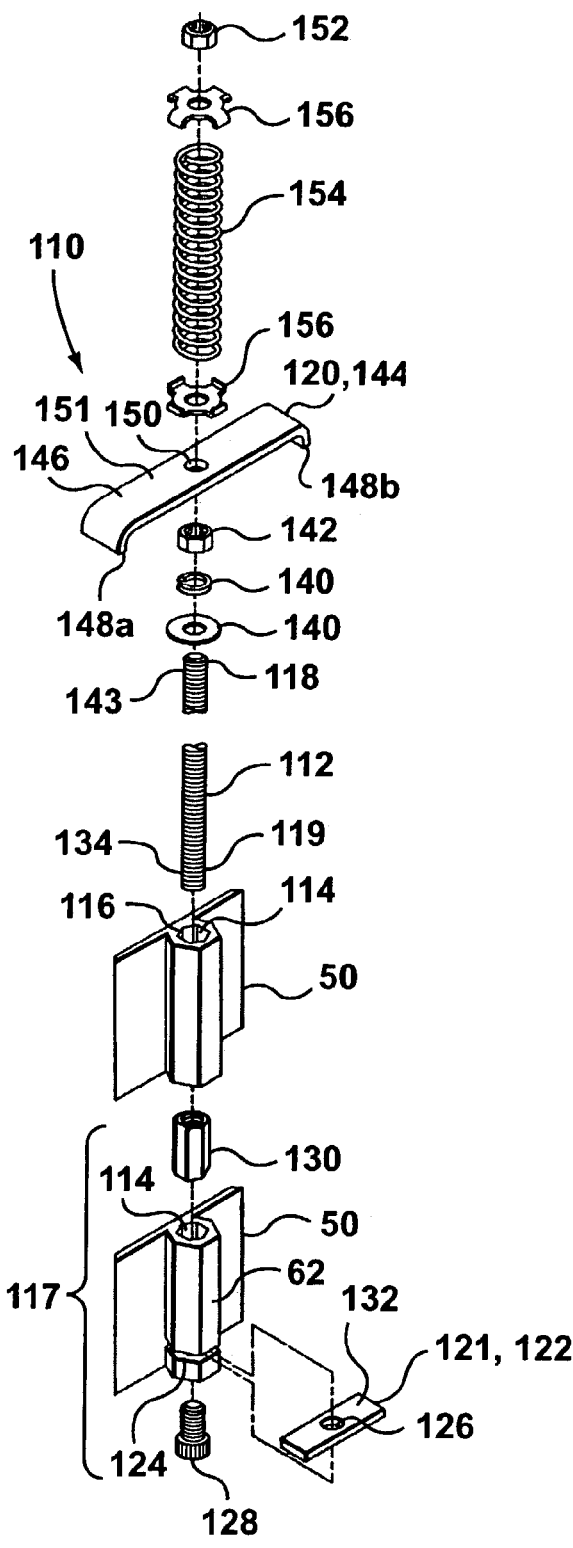
FIG. 12 is an exploded view of the through-bolt clamping apparatus of FIG. 4.

In the embodiment illustrated in FIG. 4, the through-bolt 112 of the through-bolt clamping apparatus 110 extends through the corner joint area 28 of the walls 14a, 14b at the corner 12. To accommodate the through-bolt 112, the spline 50 can be provided with a vertically oriented bolt cavity 114 (FIG. 12). In cross section, the bolt cavity may be enclosed by the spline itself, or by a combination of the spline and a sidewall of the slot.

Figure 13:
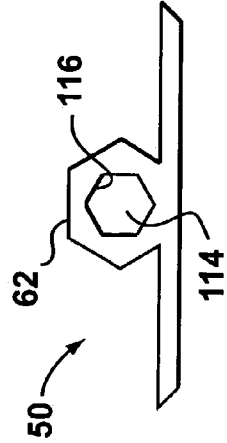
FIG. 13 is a top view of a corner spline shown in FIG. 12.

As best seen in FIG. 13, in one embodiment the bolt cavity 114 is provided within the rib 62 of the spline 50. The cross sectional area of the bolt cavity 114 is completely enclosed within the spline 50. Furthermore, in the embodiment illustrated, the bolt cavity 114 is polygonal in cross section. More specifically, the bolt cavity 114 has an inner surface 116 which is hexagonal in cross-section.

Referring again to FIG. 12, the through-bolt clamping apparatus 110 is provided with transversely extending upper and lower clamp arms 120, 121 (respectively), adjacent the upper and lower ends 118, 119 of the through-bolt 112. The upper and lower clamp arms 120, 121 are adapted to couple the through-bolt 112 to the logs 16 at the upper and lower ends of the walls 14a, 14b, respectively.

In the embodiment illustrated, the lower clamp arm 121 of the through-bolt clamping apparatus 110 is part of an anchor spline assembly 117 having an anchor plate 122 extending through a horizontal groove 124 provided across the rib 62 of the lowermost spline 50 of the corner connection structure 10. The anchor plate 122 has a centrally located aperture 126, which is aligned with the bolt cavity 114 extending through the spline 50.

A fastener 128 extends upward through the aperture 126, and engages an elongate hex-nut 130 which is provided within the bolt cavity 114, adjacent the top surface 132 of the anchor plate 122. The outer surface of the hex-nut 130 is slightly smaller than the hexagonal inner surface 116 of the bolt cavity 114, thereby permitting axial displacement of the hex-nut 130 within the bolt cavity 114, but inhibiting rotation of the hex-nut 130 when the threaded rod 112 is turned. Accordingly, an anti-rotate coupling device is provided which enables assembly and adjustment of the threaded rod 112 to the lower clamp arm 121 from the upper end of the walls 14a, 14b, without need to access the through-bolt apparatus 110 from the lower end of the walls 14a, 14b.

The fastener 128 passes through the aperture 126 in the anchor plate 122 and is tightened securely, thereby producing the anchor spline assembly 117. The length of the screw 128 and the length of the hex-nut 130 are selected so that an upper portion of the hex-nut 130 extends sufficiently beyond the upper end of the screw 128, thereby providing adequate engagement with a threaded portion 134 provided adjacent the lower end 119 of the through-bolt 112.

Figure 14:
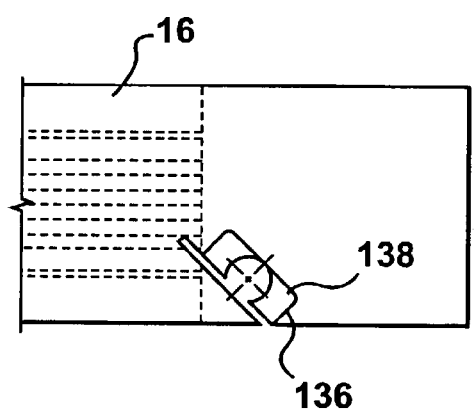
FIG. 14 is a bottom view of a lowermost log of the corner connection structure of FIG. 1.

Referring to FIG. 14, a clamp arm recess 136 is provided in the underside of the lowermost (starter) log 16 at the corner 12 of the walls 14a, 14b, to accommodate the transversely extending anchor plate 122. More specifically, the length and the width of the clamp arm recess 136 are sized slightly larger than the length and the width of the anchor plate 122. The depth of the recess 136 provides an indented horizontal contact surface 138 for bearing the clamp load applied by the through-bolt clamping apparatus 110 on the anchor plate 122.

Once the intersecting walls 14a, 14b have been completely assembled, the threaded rod 112 of the through-bolt clamping apparatus 110 can be inserted through the bolt cavity 114 and rotated so that its lower threaded end 119 securely engages the elongate hex-nut 130. Suitable washers 140 and a spline stacking nut 142 can then be installed and tightened along a threaded portion 143 provided adjacent the upper end 118 of the through-bolt 112. The spline-stacking nut serves to draw the splines 50 together, so that any seams 59 between vertically adjacent splines 50 are substantially weather-tight. The washers 140 and the spline stacking nut 142 are sized so that collectively their outer diameters are small enough to fit within the rib recess of the corner connection structure, but are large enough to provide a lower surface which positively engages an upper surface 56 of the uppermost spline 50 provided in the corner connections structure 10.

It is considered advantageous to avoid direct application of a clamp load generated by the clamping apparatus 110 onto the corner joint area 28, because the portions of the logs 16 at the corner joint area 28, namely the overlap portions 18, typically shrink more quickly than the adjoining, non-overlap portions 22. The increased rate of shrinkage can be the result of proximity to the exposed ends 17 of the logs, and because the overlap portions 18, having geometrical configurations 20, have a reduced cross-sectional area relative to the adjoining non-overlapping portions 22.

Accordingly, the upper clamp arm 120 comprises a transfer bar 144 coupled to the through-bolt 112 (FIG. 4). The transfer bar 144 is adapted to bridge the non-overlapping portions 26a, 26b of the first and second walls 14a, 14b so that a clamping load generated by the through-bolt clamping apparatus 110 can be transferred directly to the non-overlapping portions 26a, 26b rather than onto the corner joint area 28.

More specifically, the transfer bar 144 has a body 146 and a pair of spaced-apart contact pads 148a and 148b. The first contact pad 148a engages the first wall 14a at a position spaced away from the corner joint area 28, along the non-overlapping distinct wall section 26a of the wall 14a. The second contact pad 148b engages the second wall 14b at a position spaced away from the corner joint area 28, along the non-overlapping distinct wall section 26b of the wall 14b.

Referring again to FIG. 12, the contact pads 148a, 148b of the transfer bar 144 extend generally vertically from the transfer bar body 146, which extends generally horizontally between the two contact pads. In the embodiment illustrated, the transfer bar 144 comprises a plate having down-turned ends, resulting in an inverted U-shaped member.

The transfer bar 144 is provided with an aperture 150, which is centrally located along the horizontally extending transfer bar body 146. The threaded portion 143 of the upper end 118 of the through-bolt 112 passes through the aperture 150, and a clamping nut 152 can be installed adjacent an upper surface 151 of the transfer bar, to apply the compressive load on the walls.

Preferably, as shown in the embodiment illustrated, a compression spring 154 may be provided between the clamp nut 152 and the upper surface 151 of the transfer bar 144. Spring seats 156 can be provided at the upper and lower ends of the compression spring 154, to ensure that the spring 154 remains generally concentric about the through-bolt 112. The compression spring 154 can compensate for natural settling of the logs.

By spacing apart the contact pads 148a, 148b on the transfer bar 144, the downward compressive force on the walls passes through the non-overlapping portions 22a, 22b of the logs 16a, 16b rather than along the overlap portions 18a, 18b, which have a reduced cross-sectional area resulting from the geometrical configurations 20 provided therein. The present invention comprehends that the overlap portions 18 of the logs 16 may dry out more quickly, and may therefore shrink faster and to a greater extent than the adjacent non-overlapping portions 22 of the logs.

Furthermore, the present invention comprehends that the logs 16 in the walls 14 will settle over time, causing a corresponding decrease in the overall height of the walls 14. As the uppermost surface of the walls 14 shifts downwards due to settling, the spring 154 forces the transfer bar 144 downwards, thereby maintaining a positive clamping force on the walls 14. The settling gap 49, along with the additional clearance provided by downward extension of the contact pads 148 from the transfer bar body 146, ensures that the transfer bar can be pushed downward without interfering with the uppermost spline 50.

Figure 15:
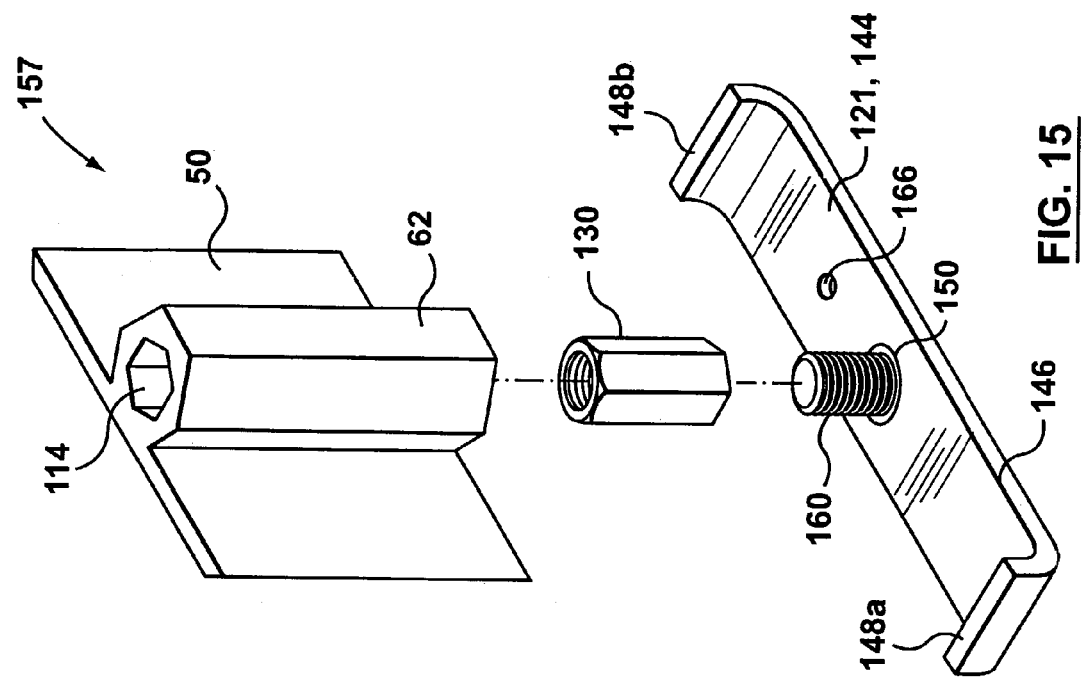
FIG. 15 is an exploded view of an alternative embodiment of a portion of the apparatus of FIG. 12.
Figure 16:
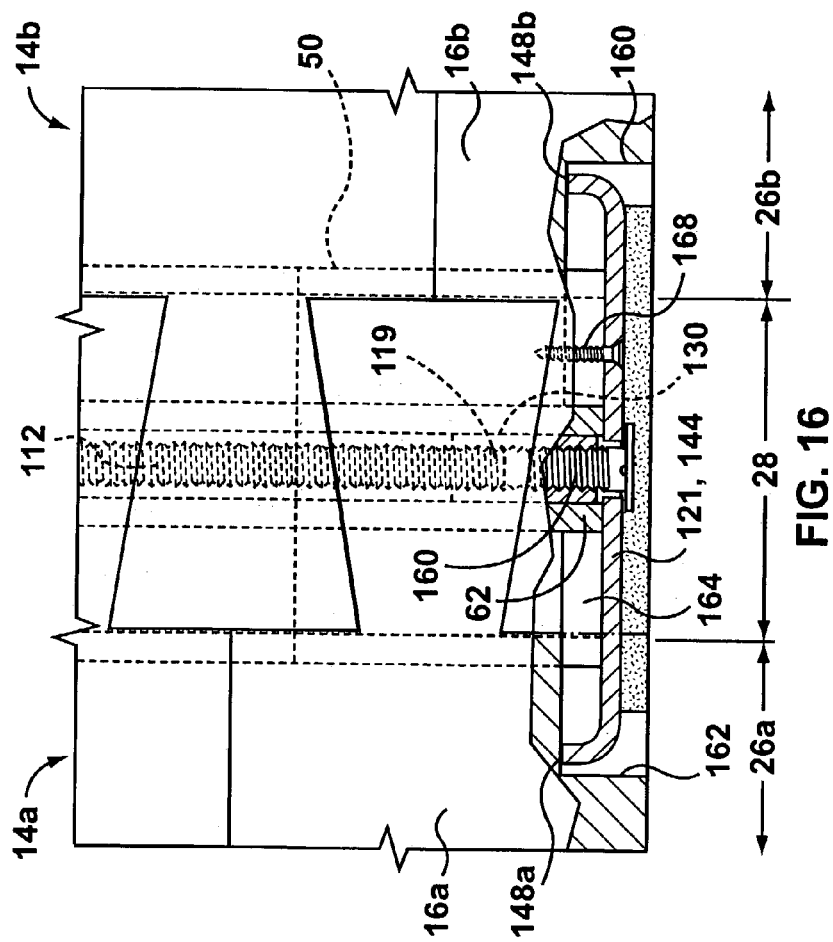
FIG. 16 is a portion of the elevation view of FIG. 4, in combination with the apparatus of FIG. 15.

To assist in transferring the clamp load generated by the clamping apparatus 110 away from the corner joint area 28 and onto the adjoining, distinct wall sections 26a, 26b of the walls 14a, 14b, an alternative anchor spline assembly 157 can be provided (FIG. 15). The anchor spline assembly 157 has a lower clamp arm 121 comprising an inverted transfer bar 144.

More particularly, the anchor spline assembly 157 has a spline 50, an elongate hex nut 130, and a transfer bar 144. The transfer bar 144 is inverted, so that the contact pads 148a, 148b, are directed upwardly. A fastener 160 extends upwardly through the aperture 150 and engages the hex nut 130. The hex nut is then inserted in the lower end of the bolt cavity 114 extending through the rib 62 of the spline 50. In the embodiment illustrated, the fastener 160 is a bolt welded to the body 146 of the transfer bar 144.

To accommodate the transfer bar 144 of the anchor spline assembly 157, a clamp arm recess 162 is provided at the lower end of the corner joint area 28 of the walls 14a, 14b at the corner 12. The clamp arm recess 162 crosses the corner joint area 28, having recess portions 162a and 162b in the logs 16a and 16b, respectively. Inner sidewalls 164 extend generally vertically along the perimeter of the recess 162. An assembly retaining screw 168, passing through an aperture 166, can be used to hold the anchor spline assembly 157 in position, prior to installation and tightening of the clamping apparatus 110.

In use, the contact pads 148a, 148b of the transfer bar 144 of the anchor spline assembly 157 engage the walls 14a, 14b along the distinct wall sections 26a, 26b respectively. Accordingly, the clamping force applied by the clamping apparatus 110 is directed through the non-overlapping portions 22a, 22b of the logs 16a, 16b in the walls 14a, 14b rather than through the overlap portions 18a, 18b.

Furthermore, the mating hex profiles of the bolt cavity 114 and hex nut 130, along with the retaining screw 168 and inner sidewalls 164 provide an anti-rotate coupling arrangement between the transfer bar 144 and the trough-bolt 112.

Referring now to the FIG. 17, the through-bolt apparatus 110 can be provided not only adjacent the corner 12, but also along the wall 14 between corners 12. A through-bolt cavity 170 extends through the logs 16 of the wall 14 to accommodate the through-bolt 112.

The through-bolt clamping apparatus 110 can be provided with an anti-rotate anchoring device 172 coupled to the lower end 119 of the through-bolt 112. In one embodiment (FIG. 18), the anchoring device 172 comprises an anchoring sleeve 174 and the lower clamp arm 121. The lower clamp arm 121 can be a pin 176 adapted to fit in a generally horizontal bore 178 passing through the anchoring sleeve 174. The pin 176 is longer than the width of the sleeve 174, so that ends 177 of the pin 176 extend beyond the outer surface of the sleeve 174.

A generally horizontal locking bore 180 is provided in the lowermost (starter) log 16 of the wall 14. The locking bore 180 intersects the through-bolt cavity 170 adjacent the bottom of the wall 14, and is adapted to receive the pin 176.

In use, the sleeve 174 of the anchoring device 172 is inserted into the through-bolt cavity 170 of the lowermost log 16 of the wall 14. The sleeve 174 is positioned so that the bore 178 of the sleeve 174 is aligned with the locking bore 180 of the log 16. The pin 176 is then inserted into the locking bore 180 and pushed through the bore 178 of the sleeve 174. A plug 181 can be inserted into the exposed end of the bore 180 for concealment.

The engagement of the ends 177 of the pin 176 with the inner surface of the locking bore 180 of the log 16 provides a bearing surface for the clamp load applied by the clamping apparatus 110, and also provides an anti-rotate coupling arrangement of the pin 176 to the lower end 119 of the through-bolt 112.

More particularly, the sleeve 174 is provided with an internally threaded vertical engagement bore 182, having a tapered lead surface 184. The lower end 119 of the through-bolt 112 can be lowered into the through-bolt cavity 170 from above, and guided into the engagement bore 182 by the tapered lead surface 184. The through-bolt 112 can then be rotated to securely engage the sleeve 174.

Figure 20:
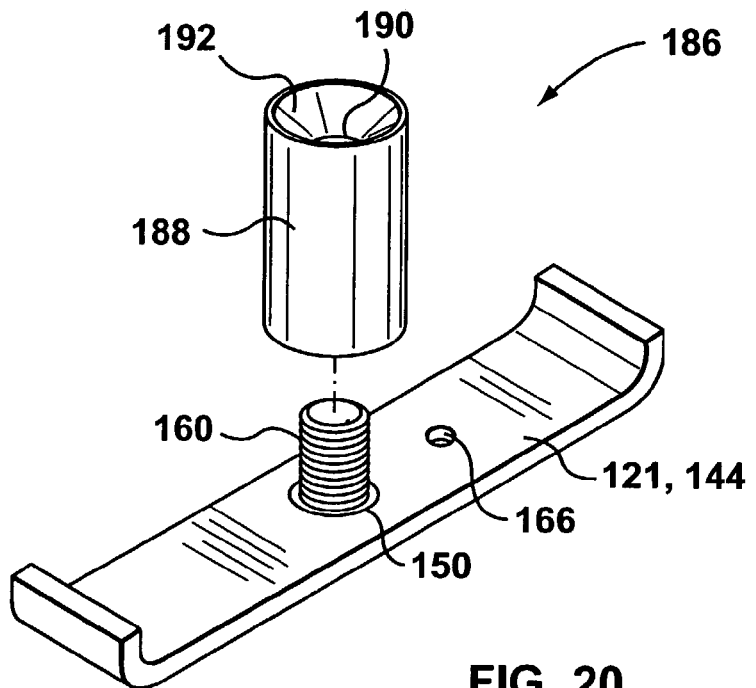
FIG. 20 is an exploded view of an alternative embodiment of a portion of the apparatus of FIG. 17.
Figure 21:
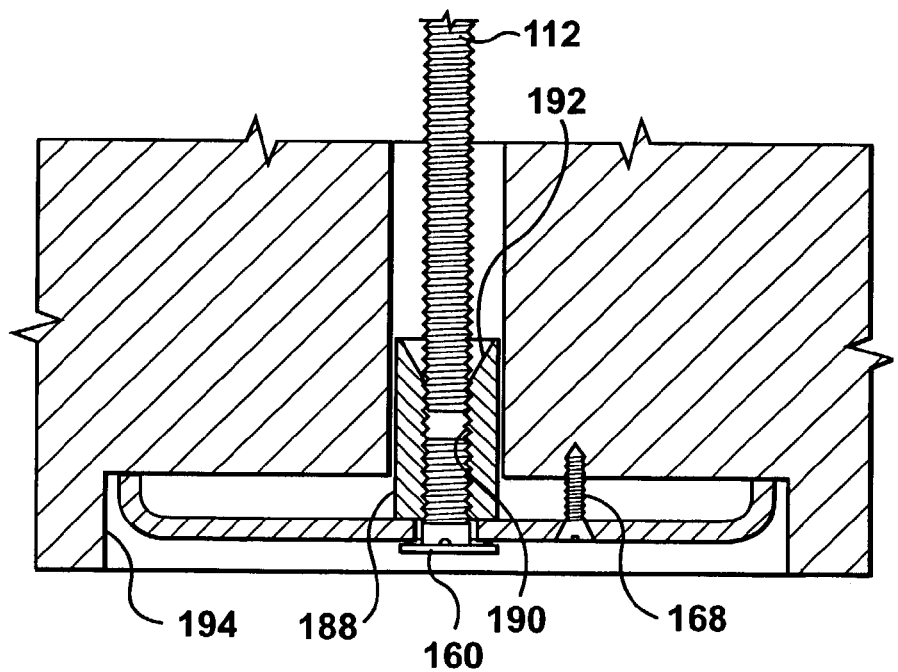
FIG. 21 is a front elevation view of FIG. 20 in combination with the apparatus of FIG. 17.

An alternative anchoring device 186 can be used in place of anchoring device 172. Referring to the FIGS. 20 and 21, the alternative anchoring device 186 comprises an inverted transfer bar 144 as its lower clamp arm 121. The fastener 160 extending from the transfer bar 144 is coupled to a generally vertical internally threaded bore 190 provided in an anchor sleeve 188. The upper end of the bore 190 of the anchor sleeve 188 is provided with a tapered lead surface 192, similar to the surface 184 of the sleeve 174.

To accommodate the transfer bar 144, a clamp arm recess 194 is provided in the underside of the lowermost log 16 of the wall 14. A retaining fastener 168 can be provided through an aperture 166 in the transfer bar 144 to retain the anchoring device 186 within the recess 194 in the log 16. The inner sidewalls of the recess 194, along with the retaining fastener 168, prevent rotation of the transfer bar 144, thereby permitting installation and adjustment of the through-bolt 112 from the upper end of the wall 14, without the need for a second person to hold tight the anchoring device 186.

Log Profile

A log profile according to the present invention is referenced in the figures generally by character 210. The log profile 210 may be provided in the log 16 used to construct walls 14 of, for example, but not limited to, a cabin or house.

Referring to FIG. 22, the profile 210 of the log 16 provides a top surface 212, a bottom surface 214, an inner side surface 216, and an outer side surface 218. The inner side surface 216 is a generally planer vertical surface, extending between upper and lower inner edges 220, 222, respectively. The outer side surface 218 is similarly a generally planer vertical surface, which extends between upper and lower outer edges 224, 226, respectively.

The top surface 212 of the profile 210 extends between the inner and outer upper edges 220 and 224. The top surface 212 has two vertically upwardly projecting tongues 230, each having inner and outer inclined sidewalls 232 and 234, respectively. In the embodiment illustrated, the outer sidewall 234 is double-inclined, having a steeper inclined upper portion 234*a*, and a less steeply inclined lower portion 234*b*. The tongues 230 have generally horizontal upper faces 236 extending between the inner and outer sidewalls 232, 234 of the tongues 230.

The profile 210 further comprises a channel 238 extending between the inner side surfaces 232, 232 of the tongues 230. A v-groove 240 is provided in the channel 238, extending along the longitudinal axis of the log 16.

The bottom surface 214 of the profile 210 extends between the inner and outer lower edges 222 and 226. The bottom surface 214 has two upwardly directed engagement grooves 242 adapted to receive the tongues 230 of the top surface 212 of an adjacent log 16. Each groove 242 has inner and outer inclined sidewalls 244, 246, respectively. In the embodiment illustrated, the outer sidewall 246 is double-inclined, having a more steeply inclined upper portion 246*a*, and a less steeply inclined lower portion 246*b*. Each groove 242 has a generally horizontal base 248 extending between the inner and outer inclined sidewalls 244 and 246.

A seal recess 250 can be provided in the base 248 of the grooves 242. In the embodiment illustrated, the seal recess 250 is positioned in the base 248 of each groove 242, immediately adjacent the outer inclined sidewall 246.

The profile 210 of the log 16 further provides a plateau surface 252 extending between the inner sidewalls 244 of the grooves 242. A v-groove 254 is provided in the plateau 252, extending along the longitudinal axis of the log 16.

The bottom surface 214 of the log 16 is also provided with reflexively inclined margin surfaces 256 adjacent the inner and outer side surfaces 216 and 218. More specifically, one margin surface 256 extends between the lower inner edge 222 of the log 16 and the outer sidewall 246 of the adjacent groove 242. Similarly, a second margin surface 256 extends between the lower outer edge 226 of the log 16 and the outer sidewall 246 of the adjacent groove 242.

In use (FIG. 23), the top surface 212 and the bottom surface 214 of vertically adjacent logs 16 interlock with each other to provide accurate stacked alignment of the logs in the wall 14. More particularly, the tongues 230 of the top surface 212 of one log 16 engage the grooves 242 of the bottom surface 214 of another log 16 positioned immediately above the first log. The slopes of the inclined tongue sidewalls 232, 234 match the slopes of the corresponding groove sidewalls 244, 246 so that they are in flush contact with each other. This contact assists in positively locating the logs relative to each other, and provides lateral stability of the wall 14 in a direction perpendicular to the axes of the logs 16.

Furthermore, the upper faces 236 of the tongues 230 contact the base surfaces 248 of the grooves 242, to provide positive vertical positioning of one log 16 relative to another.

The staggered seam created by the adjacent top and bottom surfaces 212, 214 provided by the log profile 210 also assists in keeping out the weather. To further improve the weather proofing characteristics of the interface between the upper surface 212 and the lower surface 214 of adjacent logs 16, sealant 258 is provided in the seal recess 250 of the bottom surface 214. The sealant 258 can be, for example, but not limited to, asphalt-impregnated sealant tape. Preferably, the sealant 258 is compressed by the assembly of one log 16 on top of another, to enhance the sealing action of the sealant 258.

The location of the sealant 258 along the interface between the top surface 212 and bottom surface 214 of adjacent logs 16 is also instrumental in blocking out moisture. Specifically, with reference again to FIG. 23, the sealant 258 is located along the base 248 of the groove 242 immediately adjacent the interface between the inclined sidewalls 234 and 246 of the tongue 230 and groove 242, respectively. Accordingly, the sidewall 234 presents an upwards slope towards any moisture attempting to enter the interface between the adjacent logs 16, from the exposed side surface 218, 216. The force of gravity is thereby used to inhibit the penetration of moisture through the interface.

Furthermore, the distal portion of the interface between the logs 16 that extends from the outside face 218 to the seal 258 has no horizontal surfaces. The sloping nature of the interface along that portion of the cross-section of the logs inhibits the collection of water between the logs.

Advantages of the double inclined outer sidewalls 234 of the tongue 236 and the margin surface 256 are also best seen in FIG. 23. In particular, the double inclined sidewall 234 increases the cross sectional area of material of the log 16 between the tongue 230 and the outside face 218 of the log 16. This strengthens the lower outer portions of the logs 16, and resists any lateral outward force exerted by the stacked weight of the logs. As well, the double inclined sidewall 234 and the margin surface 256 provide a blunter point 260 at the bottom of the log 16, which may be less susceptible to damage during transport and handling of the logs 16.

The interaction of the v-grooves 240 and 254 provided in the top surface 212 and bottom surface 214 of the logs 16 can also best be seen in FIG. 23. Specifically, the opposed v-grooves 240 and 254 co-operate to form an aperture 262 between vertically adjacent logs 16 in the wall 14. The aperture 262 can serve a number of uses, some of which will be discussed hereinafter.

Figure 24:
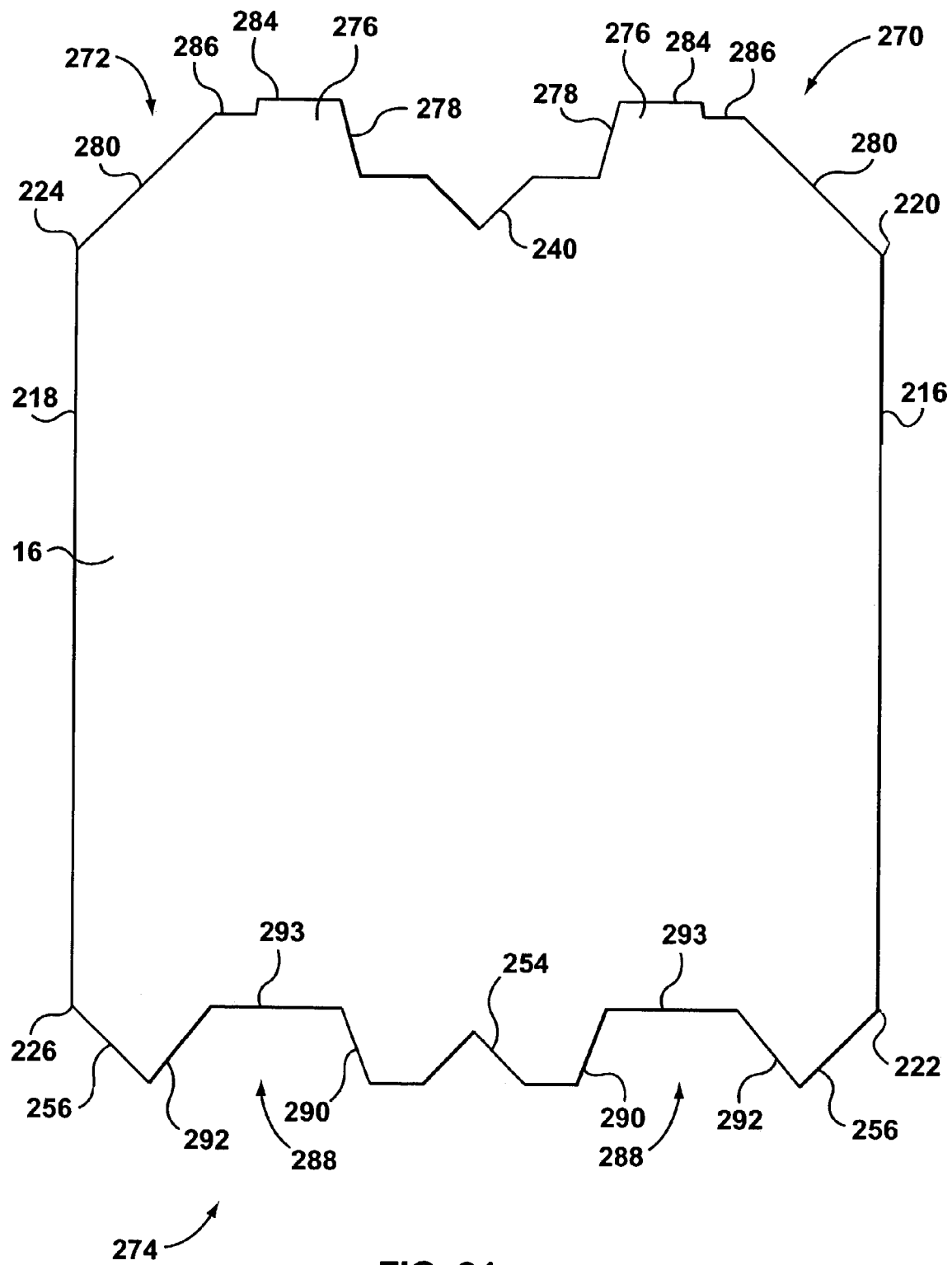
FIG. 24 is a cross-sectional view of an alternative embodiment of a log profile according to the present invention.

Referring now to FIG. 24, an alternative profile 270 for the logs 16 has a modified top surface 272 extending between the inner and outer upper edges 220 and 224, and a modified bottom surface extending between the inner and outer lower edges 232 and 226 of the log 16.

The top surface 272 has a pair of upwardly extending tongues 276, each having inner and outer inclined sidewalls 278, 280, respectively. Each tongue 276 has a top face 284 extending between the inner and outer sidewalls 278, 280. A step-shaped seal recess 286 is provided in the top face 284 of each tongue 276, immediately adjacent the outer sidewall 280.

The bottom surface 274 of the log profile 270 has a pair of grooves 288, each having inner and outer inclined sidewalls 290 and 292, respectively. Each groove 288 has a base 293 extending between the inner and outer sidewalls 290, 292.

Figure 25:
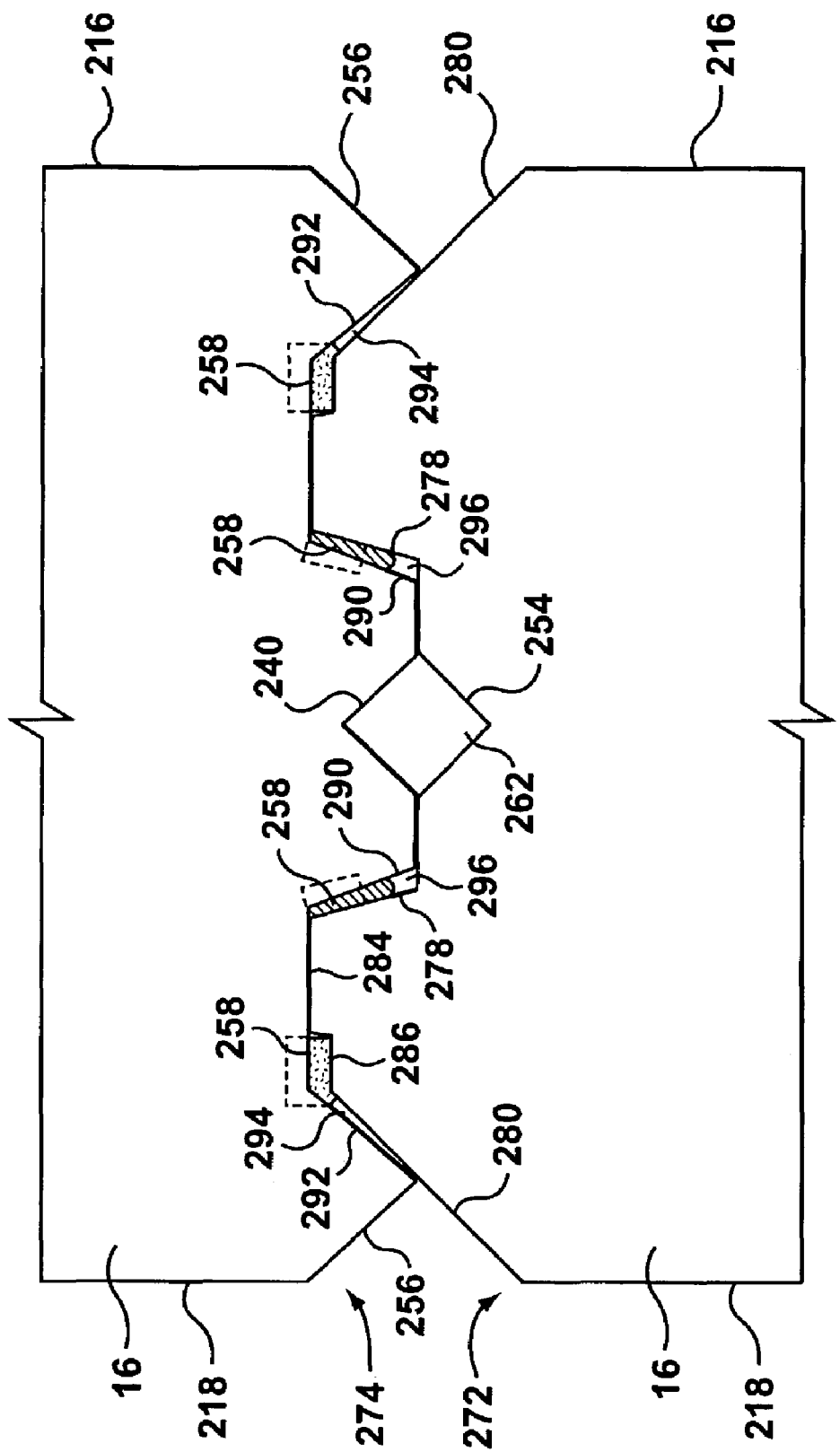
FIG. 25 is a cross-sectional view of one log of FIG. 24 stacked upon another.

In the alternative profile 270, the slopes of the inclined tongue sidewalls 278, 280 do not match the corresponding groove sidewalls 290, 292 (FIG. 25). More specifically, in the embodiment illustrated, the outer sidewalls 292 of the grooves 288 are sloped more steeply than the outer sidewalls 280 of the tongues 276. As well, the inner sidewalls 278 of the tongues 276 are sloped more steeply than the inner sidewalls 290 of the grooves 288.

Accordingly, when one log 16 is placed on top of another log 16 in the wall 14, the tongues 276 of the top surface 272 engage the grooves 288 of the bottom surface 274 of the adjacent log 16. However, the sidewalls 278, 280 of the tongues 276 are not in flush contact with the sidewalls 290, 292 of the grooves. Rather, cavities 294 are provided between the sidewalls 280 and 292. Similarly, cavities 296 are provided between the sidewalls 278 and 290.

The cavities 294 cooperate with the seal recess 286 to accommodate the sealant 258. The cavities 296 can accommodate additional sealant 258 to further enhance the weather-proofing characteristics of the log interface and to provide lateral stability for alignment of the logs. When the top surface 272 and the bottom surface 274 of two adjacent logs 16 engage each other, the sealant 258 in the cavities 294 and 296 is compressed and squeezed downward within the cavities 294, 296 into wedge-shaped seal elements. This fills a portion of the space between the opposed vertically inclined sidewalls, thereby locating the corresponding logs in horizontal alignment with each other. Moreover, the vertically adjacent logs can shrink and expand independently without compromising the weather-proofing characteristics of the sealed interface, since the resilient sealant 258 can expand and contract to accommodate any difference in the rates of expansion or contraction of the logs 16. In addition, the sealant 258 is positioned away from the center of the log where apertures for plumbing, electrical wiring, or through-bolts are typically provided. Accordingly, the sealant 258 in the embodiment illustrated can extend without interruption along the length of the walls 14, and problems related to squeeze-out of sealant entering such apertures are eliminated.

Wall Opening Support Structure

An opening support structure according to the present invention is shown generally in the Figures at reference character 310. Referring to FIG. 1, the support structure 310 is provided adjacent an opening 312 in the wall 14. The opening 312 may be provided in the wall 14 for a variety of reasons, such as, for example, but not limited to, accommodating a window, door, or fireplace.

Figure 26:
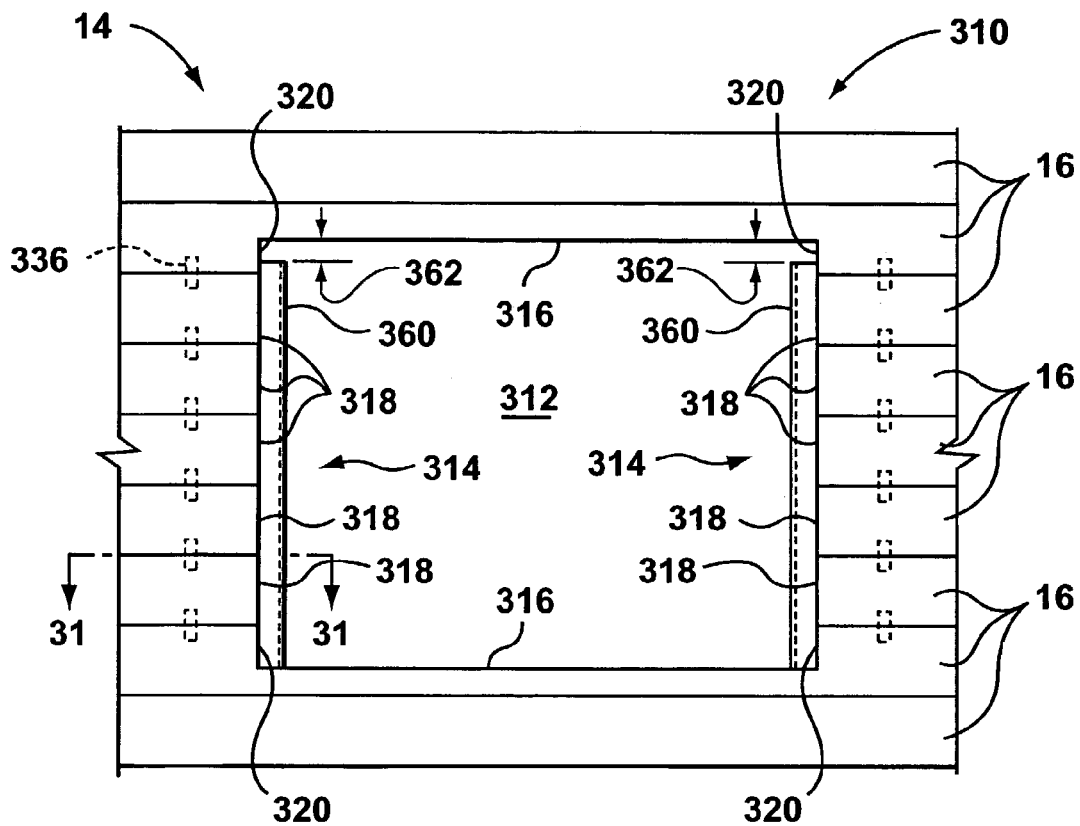
FIG. 26 is a front elevation view of the wall opening support structure of FIG. 1.

Referring now to FIG. 26, the opening 312 extends between vertical side surfaces 314 and upper and lower horizontal surfaces 316 extending along the logs 16 forming the wall 14. In milled log packages, the vertical side surfaces 314 of the opening 312 may be precut, providing end faces 318 along either side surface 314 of the opening 312. Typically, these precut end faces 318 are only provided for logs whose full cross sectional height abuts the sides 314 of the opening 312. If the height of the opening 312 must be extended partially across the height of adjacent logs, the builder can make vertical extension cuts 320 in logs which run adjacent the upper or lower sides 316 of the opening 312. In such cases the log material extending between the extension cuts 320 of opposing side surfaces 314 must also be removed, thereby producing the horizontal surfaces 316 of the opening 312.

Referring now to FIG. 27, in openings 312 having a full cross-sectional log 16 extending along the lower horizontal surface 316, support blocks 322, 324 can be provided along the top surface 212 of the log 16 having a profile 210, to square off the lower surface 316 of the opening 312. In particular, and with reference to FIG. 28a, the support blocks 322 each have an inclined base 326 in flush contact with the inclined sidewalls 234 of the tongues 230. A generally horizontal support surface 328 is provided opposite the base 326. Referring to FIG. 28b, the support block 324 is generally rectangular in cross-section, having a base 330 in flush contact with the channel 238 between the tongues 230 of the log 16 having the profile 210. A generally horizontal support surface 332 is provided opposite the base 330 of the support block 324.

Figure 29:
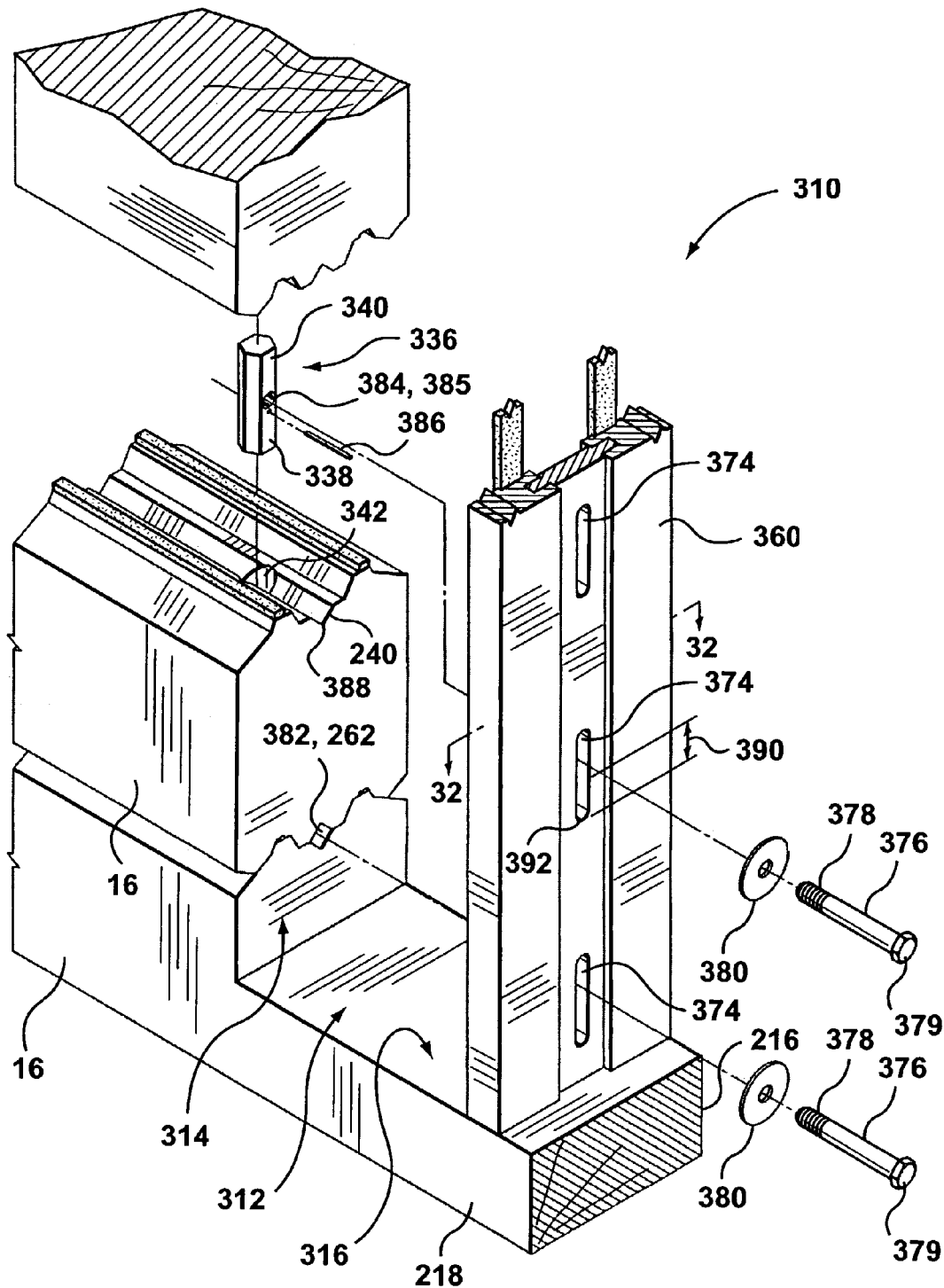
FIG. 29 is a perspective view of the structure of FIG. 26 showing further details.

Referring to FIGS. 26 and 29, the support structure 310 comprises connectors 336 positioned within the wall 14 adjacent the opening 312. The connectors 336 have a connector body with lower and upper log engagement portions 338, 340. In the embodiment illustrated, the connectors 336 comprise dowel pins which are vertically oriented in the wall 14. The lower engagement portion 338 engages a log in one course of the wall, and the upper engagement portion 340 engages the log immediately above the log engaged by the lower log engagement portion 338.

The number of connectors 336 provided along each vertical side 314 of the opening 312 is such that each log 16 having a fully exposed end face 318, has a connector 336 extending from both the upper and lower surfaces of the log (FIG. 26). Accordingly, the lowermost logs having end faces 318 adjacent the opening 312 are connected to the log below, which spans the opening 312. Similarly, the uppermost logs 16 having end faces 318 adjacent the opening 312 are connected to the log above, which spans the openings 312. The connectors 336 thereby serve to strengthen the wall 14 at the opening 312, and to align and support the logs as the wall is being built.

Figure 30:
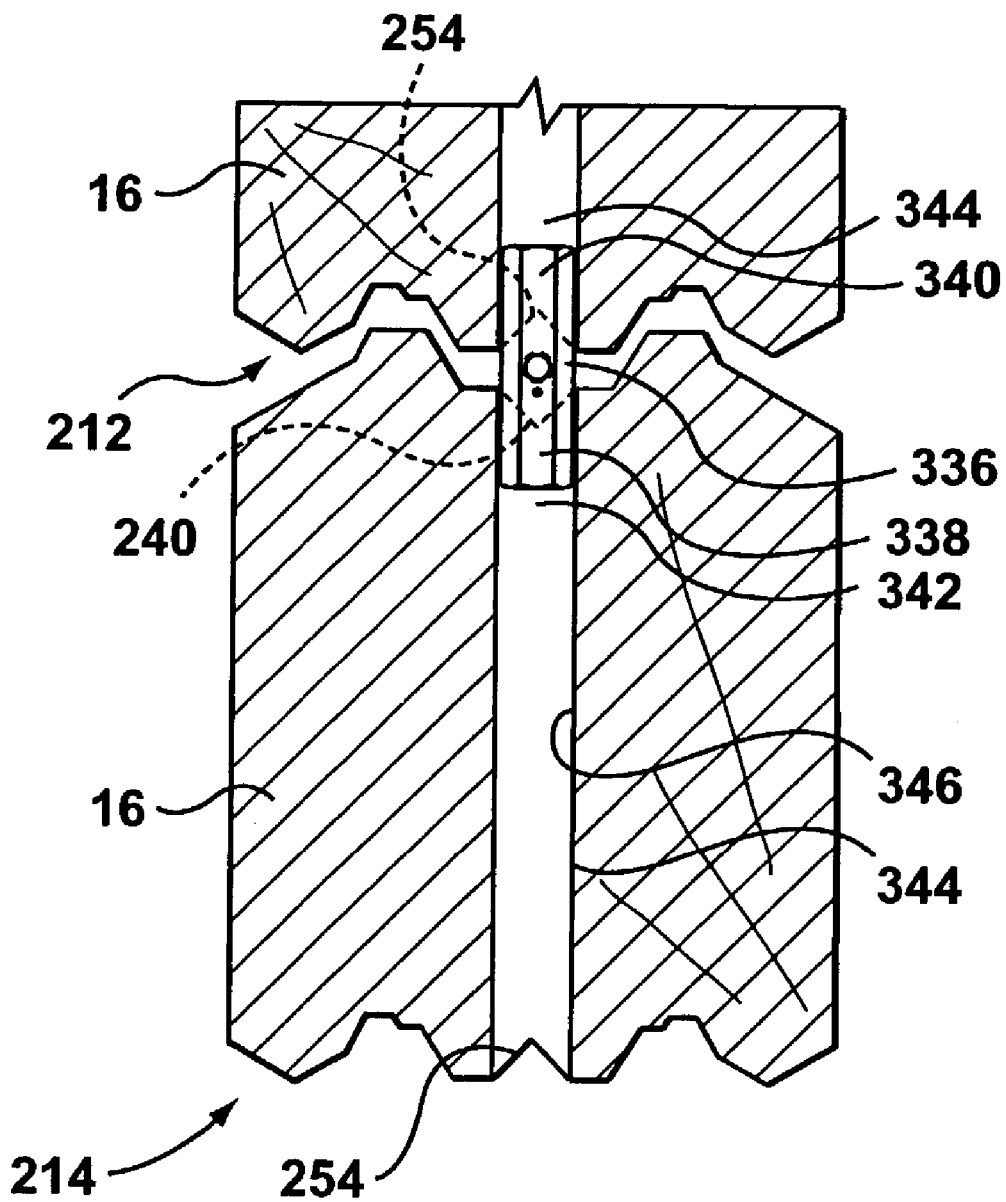
FIG. 30 is a side elevation view in cross-section of a portion of the structure of FIG. 26.

As best seen in FIG. 30, the logs 16 are provided with upper and lower connector apertures 342, 344, respectively, adapted to receive the lower and upper log engagement portions 338, 340 of the connectors 336. The upper and lower connector apertures 342, 344 extend into the top and bottom surfaces 212, 214 of adjacent logs 16, and can comprise upper and lower portions of apertures 346 extending through the height of the logs 16 adjacent the opening 312 in the wall 14.

The apertures 342, 344 are generally centrally located across the cross-sectional width of the logs 16. More specifically, the apertures 342, 344 intersect the v-grooves 240, 254 provided in the top and bottom surfaces 212, 214 of the logs 16. Along the length of the logs 16, the apertures 342, 344 are spaced away from the end faces 318 of the logs 16, so that an axial load bearing portion 348 of the log 16 is provided between the apertures 342, 344 and the end faces 318 (FIG. 31).

Figure 31:
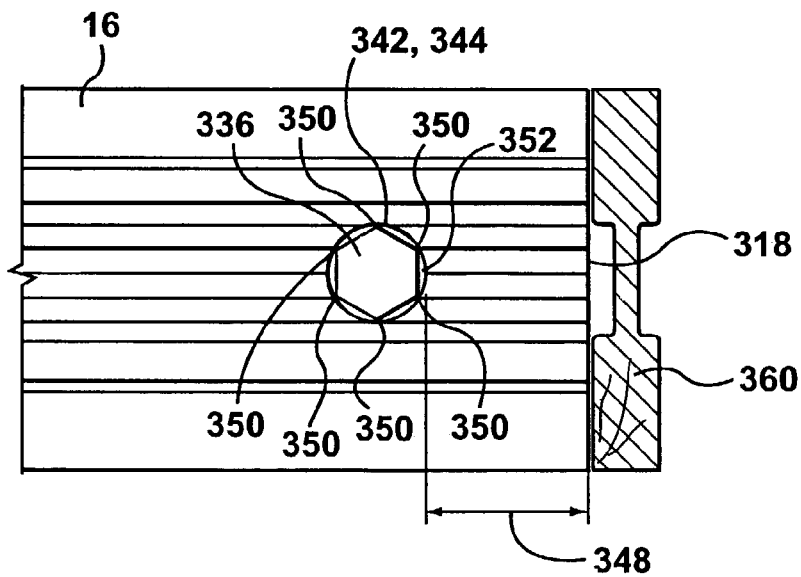
FIG. 31 is a top sectional view of a portion of the structure of FIG. 26.

Referring now to FIG. 31, the cross-sectional profile of the outer surface of the connector 336 can be shaped to cooperate with the inner surface of the apertures 342, 344 so that areas of contact 350 between the connector 336 and the apertures 342, 344 are interspersed with areas of non-contact 352. In the embodiment illustrated, the connector body is hexagonal and the apertures 342, 344 are cylindrical. The vertices of the outer surface of the connector 336 are sized to have a slight interference fit with the apertures 342, 344. This provides good holding contact, while also accommodating some degree of misalignment between the apertures 342, 344 provided in vertically adjacent logs 16.

Referring again to FIG. 26, the opening support structure 310 further comprises a sub-jamb member 360 positioned along each vertical side surface 314 of the opening 312. The sub-jamb members 360 do not extend the full height of the opening 312, but rather, a settling gap 362 is provided between the upper horizontal surface 316 of the opening 312 and the upper end of the sub-jamb members 360. Typically, this gap would be about 1.5 inches, to accommodate natural settling of the logs over time.

Figure 32:
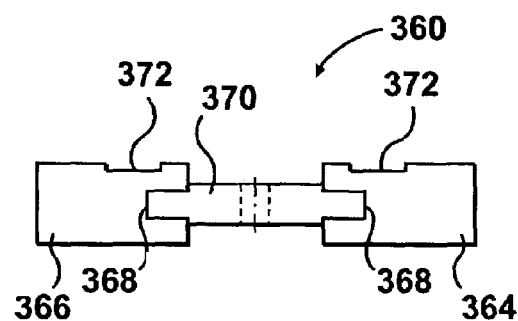
FIG. 32 is a top sectional view of a sub-jamb member of FIG. 29.
Figure 33:
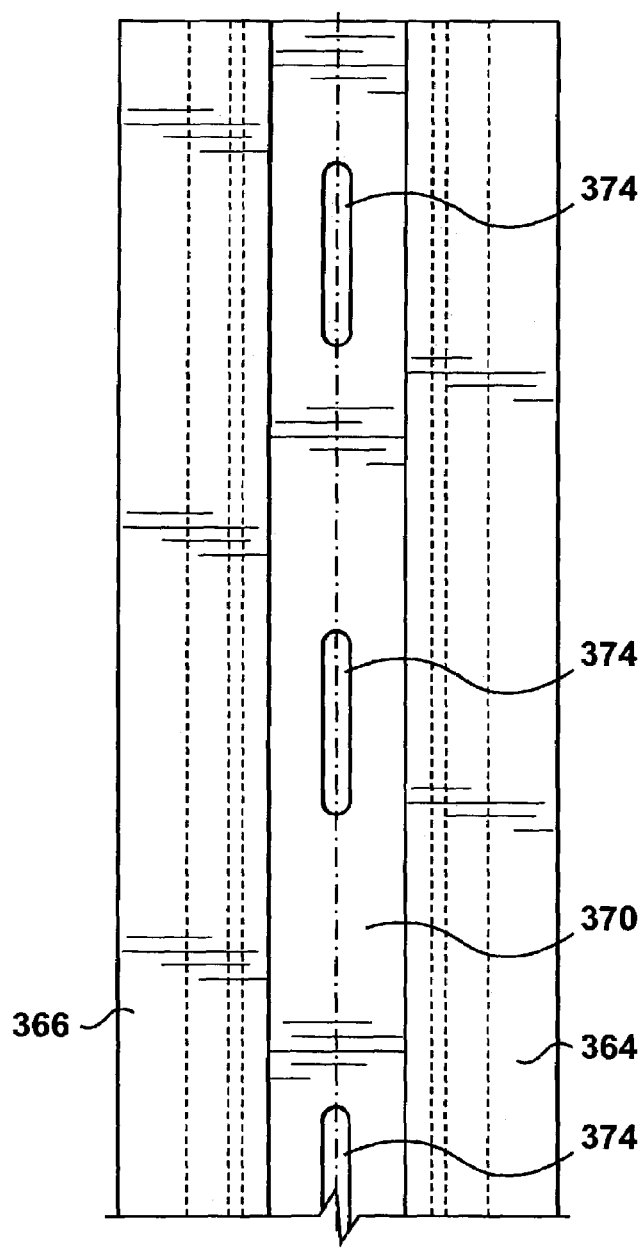
FIG. 33 is a front elevation view of the sub-jamb member of FIG. 32.

As best seen in FIG. 32, each sub-jamb 360 has inner and outer vertical struts 364, 366 aligned with the inner and outer faces 216, 218 (respectively) of the logs 16. Each strut 364, 366 is provided with a vertical groove 368, the openings of which face each other in horizontal and vertical alignment. The grooves 368 cooperate to receive a central panel 370. The struts 364, 366 are also provided with vertically extending seal recesses 372 along the surface of the struts 364, 366 which lie adjacent the vertical side surfaces 314 of the opening 312. Vertically elongate slots 374 are provided in the central panel 370 of the sub-jamb 360.

To install the sub-jamb member 360 of the opening support structure 310, fasteners 376 are provided. The fasteners 376 couple the sub-jamb member 360 to the connectors 336.

More specifically, with reference again to a preferred embodiment illustrated in FIG. 29, the fasteners 376 can comprise bolts having an external threaded portion 378 at one end, and a bolt head 379 at the opposite end. The bolts 376 extend through the slots 374 of the sub-jamb member 360, with the threaded portion 378 directed into the vertical side surface 314 of the opening 312. Washers 380 can be inserted between the sub-jamb 360 and the heads 379 of the bolts 376.

Fastener access passageways 382 are provided in the logs 16 to accommodate the bolts 376. The fastener access passageways 382 extend between the connectors 336 and the vertical side surfaces 314 of the opening 312. In the embodiment illustrated, the aperture 262 created by the opposed v-grooves 240, 254 in the logs 16 provides the fastener access passageways 382.

The connectors 336 are provided with fastener coupling means 384, for coupling the fasteners 376 to the connectors 336. In the embodiment illustrated, the fastener coupling means 384 comprises an internally threaded bore 385 extending horizontally through the connector body, at a position between the first and second log engagement portions 338, 340. The internally threaded bore 385 is adapted to engage the threaded portion 378 of the bolt 376.

The connectors 336 can be further provided with an alignment pin 386 extending generally horizontally beyond the body of the connector 336. The alignment pin 386 can engage an alignment surface 388 on an adjacent log, to assist in aligning the fastener coupling means 384 with the fastener access passageway 382. In the embodiment illustrated, the alignment pin 386 is positioned below and in parallel alignment with the internally threaded bore 385. The converging portion of the v-groove 240 provided in the upper surface 212 of the logs 16 provides the alignment surface 388.

Having aligned the internally threaded bores 385 with the fastener access passageways 382, the threaded portions 378 of the bolts 376 can engage the internally threaded bores 385 upon insertion through the passageways 382. The bolts 376 can then be tightened to draw the sub-jamb 360 snugly against the vertical side surfaces 314 of the opening 312.

Figure 34:
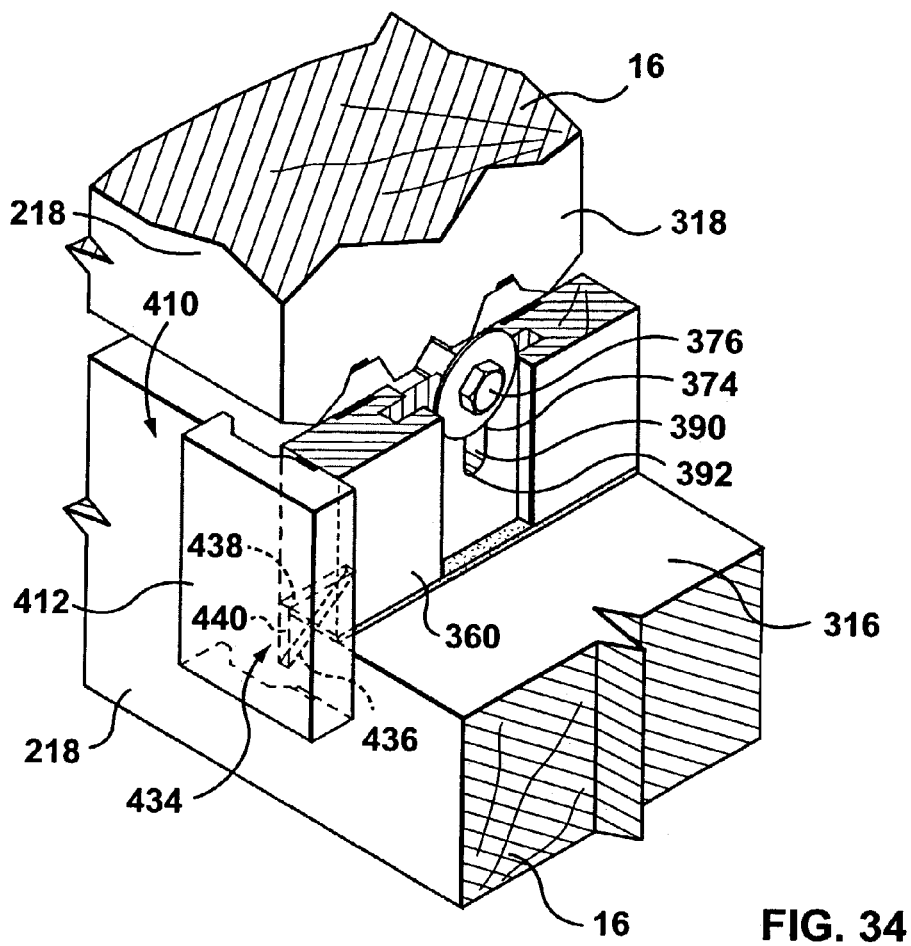
FIG. 34 is a perspective view showing further details of the opening support structure and exterior side casing structure of FIG. 1.

Upon initial installation, prior to any settling, the relative position of the bolts 376 along the length of the slots 374 is such that a space 390 is provided between the lower edge 392 of the slot 374 and the bolt 376 (FIG. 34). The space 390, along with the settling gap 362 (FIG. 26), accommodate a reduction in the height of the opening 312 which naturally occurs as the logs 16 settle over time. In particular, the bolts can shift downwards within the slots 374, towards the lower edges 392 of the slots 374. Similarly, the upper horizontal surface 316 of the opening 312 can shift downwards towards the upper edges of the sub-jamb members 360.

This ability to accommodate settling of the logs 16 reduces or eliminates the high stress loads which would otherwise be transmitted onto the sub-jamb members 360 as the logs 16 settled over time. Accordingly, the sub-jamb members 360 provide attachment surfaces to which structural elements of a window or door can be fastened, without risk of distortion or damage to the window or door.

Furthermore, by coupling the sub-jamb members 360 to the connectors 336, reliable mounting of the sub-jamb members 360 is realized. In particular, the retaining force that holds the sub-jamb members 360 in place is applied across the load-bearing portion 348 of the logs 16 (FIG. 31). This is in contrast to simply embedding a fastener in the end grain of the logs 16 through the exposed end faces 318. Fasteners embedded in log end grain are susceptible to loosening as the fibers of the wood can easily spread apart.

Exterior Side Casing Structure

An exterior side casing structure according to the present invention is shown generally in FIG. 1 at reference character 410. The side casing structure 410 is provided on the outside of the wall 14 around the perimeter of the opening 312.

Referring to FIG. 34, the casing structure 410 comprises vertical casing members 412 extending along the outer side surfaces 218 of the logs 16, at a position adjacent the sub-jamb members 360 of the opening support structure 310.

Figure 35:
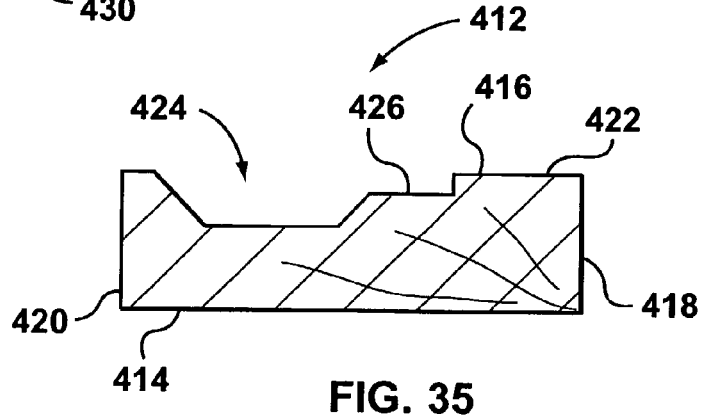
FIG. 35 is a cross-sectional view of a portion of the exterior side casing structure of FIG. 34.

Referring to FIG. 35, the vertical casing members 412 can be generally rectangular in cross-section, having a front face 414, a rear face 416, and inner and outer side surfaces 418 and 420, respectively. The rear face 416 has a mounting surface 422 adjacent the inner side surface 418. A channel 424 is provided in the rear face 416 adjacent the outer side surface 420.

Between the channel 424 and the mounting surface 422 of the rear face 416, a seal recess 426 is provided. A sealant 428 (FIG. 36) can be provided in the seal recess 426. The sealant 428 can be, for example, but not limited to, asphalt-impregnated sealant tape.

Figure 36:
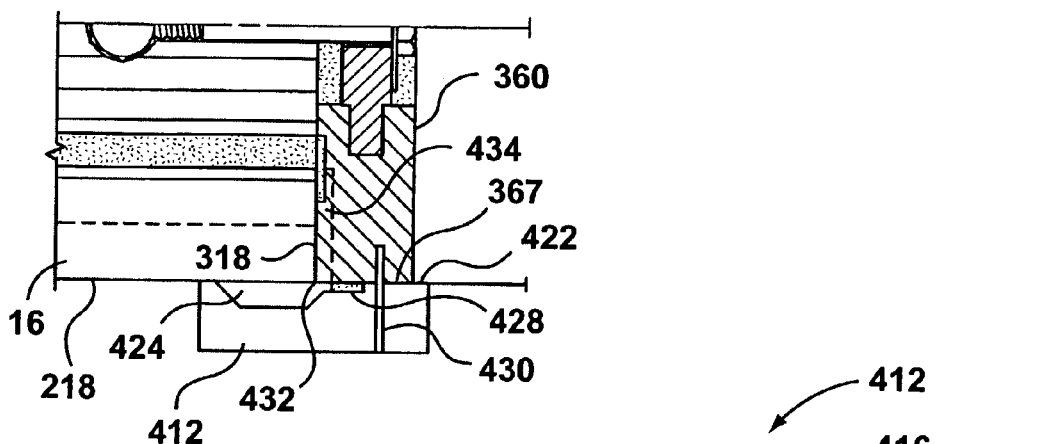
FIG. 36 is a top view of the exterior casing structure of FIG. 34.

Referring to FIG. 36, the vertical casing members 412 are mounted adjacent the opening 312 by securing the mounting surface 422 of the rear face 416 to the sub-jamb member 360. In particular, the mounting surface 422 of casing member 412 is seated against an outside edge surface 367 of the sub-jamb member 360. Suitable adhesive or fasteners can be used to attach the casing member 412 to the sub-jamb 360. In the embodiment illustrated, finishing nails 430 are used to attach the casing member 412 to the sub-jamb 360.

As best seen in FIG. 36, the channel 424 spans the seams 432 between the sub-jamb 360 and the end faces 318, 320 of the logs 16 adjacent the opening 312. This provides drainage and ventilation for any moisture which may penetrate the area behind the casing members 412 and the seams 432.

To enhance the drainage of any moisture behind the casing members 412, drainage troughs 434 can be provided in the lower horizontal surface 316 of the opening 312, directly below the seams 432 and adjacent the channel 424 of the casing member 412. In the embodiment illustrated, the drainage troughs 434 comprise grooves having an inclined base 436, an open upper edge 438 facing the lower end of the sub-jamb 360, and an open front edge 440 facing the channel 424 of the casing member 412.

Butt Joint Connection Structure

A butt joint connection structure according to the present invention is shown generally in FIG. 1 at reference character 510. The butt joint connection structure 510 is provided between adjacent end faces of any two logs 16 comprising the walls 14 so that the logs 16 may be joined together end-to-end.

Figure 37:
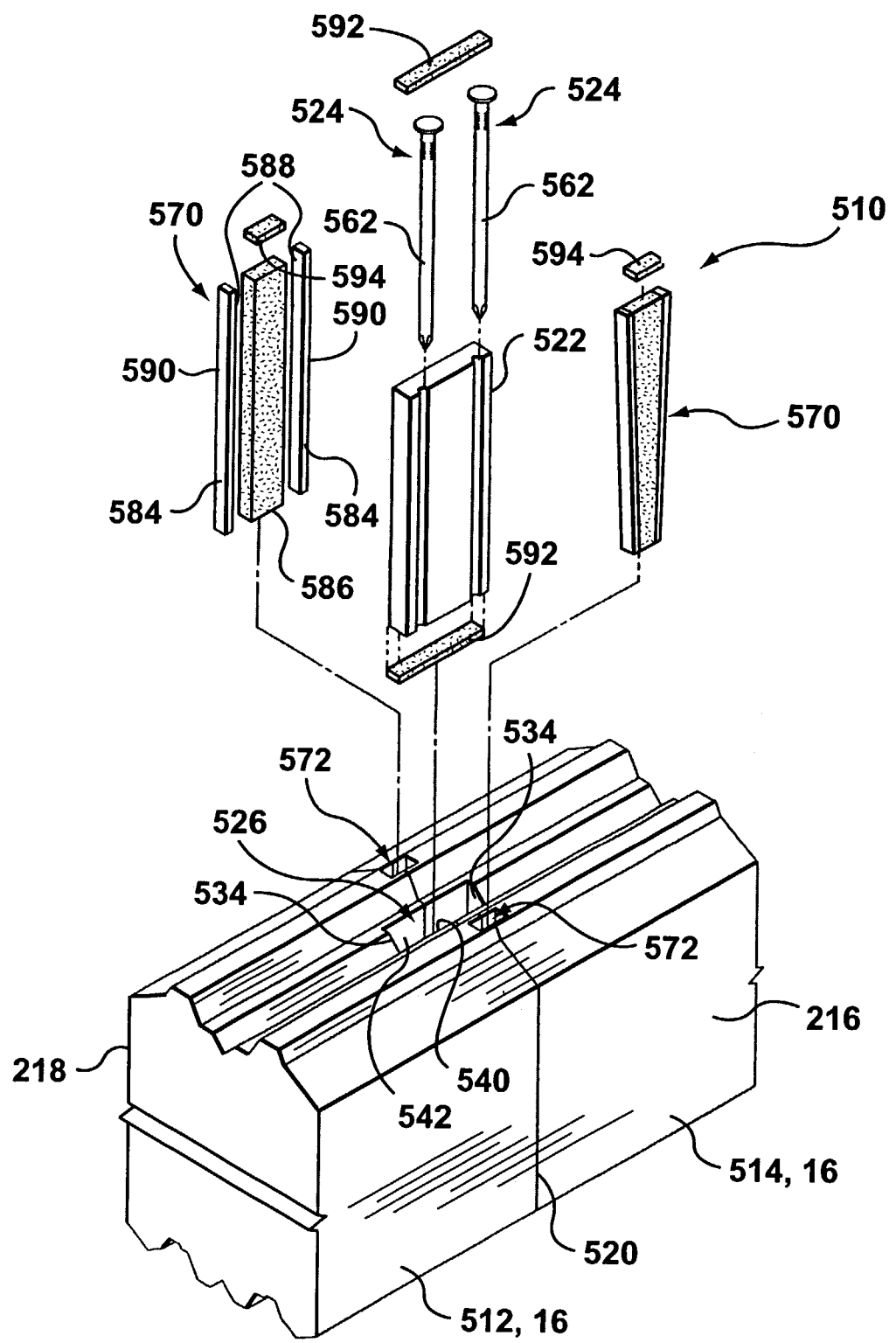
FIG. 37 is an exploded perspective view of the butt joint connection structure of FIG. 1.

Referring now to FIG. 37, the butt joint connection structure 510 is illustrated in combination with two logs 512 and 514 of the logs 16 forming the wall 14. The logs 512, 514 have end faces 516, 518, respectively, (not shown), which are in flush contact with each other forming a seam 520 between the logs 512, 514.

The butt joint connection structure 510 comprises a butt spline 522 and fasteners 524. The butt spline 522 is adapted to be received in a generally vertical spline slot 526 which spans the seam 520 between the adjacent end faces 516, 518 of the logs 512, 514. In the embodiment illustrated, the butt spline slot 526 extends horizontally in a direction which is substantially parallel to the common longitudinal axes of the logs 512, 514.

To form the butt spline slot 526, spline grooves 528, 530 are provided in the end faces 516, 518 of the logs 512, 514, respectively (FIG. 38). Each butt spline groove 528, 530 has an open vertical edge 532 provided in the end face 516, 518 and an opposed closed vertical edge 534 opposite the open vertical edge 532. Opposed butt spline groove inner and outer side faces 536, 538 extend between the open and closed vertical edges 532, 534.

The butt spline grooves 528 and 530 in the logs 512 and 514 are positioned so that the open vertical edges 532 align to face each other. The inner side faces 536 of the grooves 528 and 530 cooperate to form a generally continuous inner sidewall 540 of the butt spline slot 526. Similarly, the outer side faces of the grooves 528 and 530 cooperate to form a generally continuous outer sidewall 542 of the butt spline slot 526 (FIG. 37).

Referring now to FIG. 39, the butt spline 522 is generally rectangular in cross-section, being adapted to fit snugly in the butt spline slot 526. The butt spline 522 has a thickness 546 which fits between the opposed inner and outer sidewalls 540, 542 of the slot 526, and a width 548 which fits between the opposed closed vertical edges 534 of the slot 526. The butt spline 522 has an inner face 550 in flush contact with the inner sidewall 540 of the slot 526, and an opposed outer face 552 in flush contact with the outer sidewall 542 of the slot 526. The height of the butt spline 522 extends substantially along the cross-sectional height of the logs 512, 514. The butt spline 522 can be constructed of wood, polymer, or any other suitable material.

The butt spline 522 is provided with vertically extending fastener recesses 554 that are adapted to cooperate with the fasteners 524 for securing the butt joint connection structure 510. In the embodiment illustrated, two recesses 554 are provided along the inner face 550 of the spline 522. The recesses 554 are generally semi-circular in cross-section, providing a recess opening 556 in the plane of the inner face 550 of the spline 522. Furthermore, lateral catch surfaces 558 are provided along the inner surface of the recesses 554, extending inwardly from either edge of the recess openings 556. The catch surfaces 558 of the recesses 554 interact with the fasteners 524 to secure the butt joint connection structure 510, as will be described subsequently.

The two recesses 554 are spaced apart so that one recess is on either side of the seam 520 between the logs 512, 514. In other words, the recess opening 556 of one recess 554 abuts the inner side face 536 of the groove 528 provided in the log 512. The recess opening 556 of the second recess 554 abuts the inner side face 536 of the groove 530 provided in the log 514.

Figure 40:
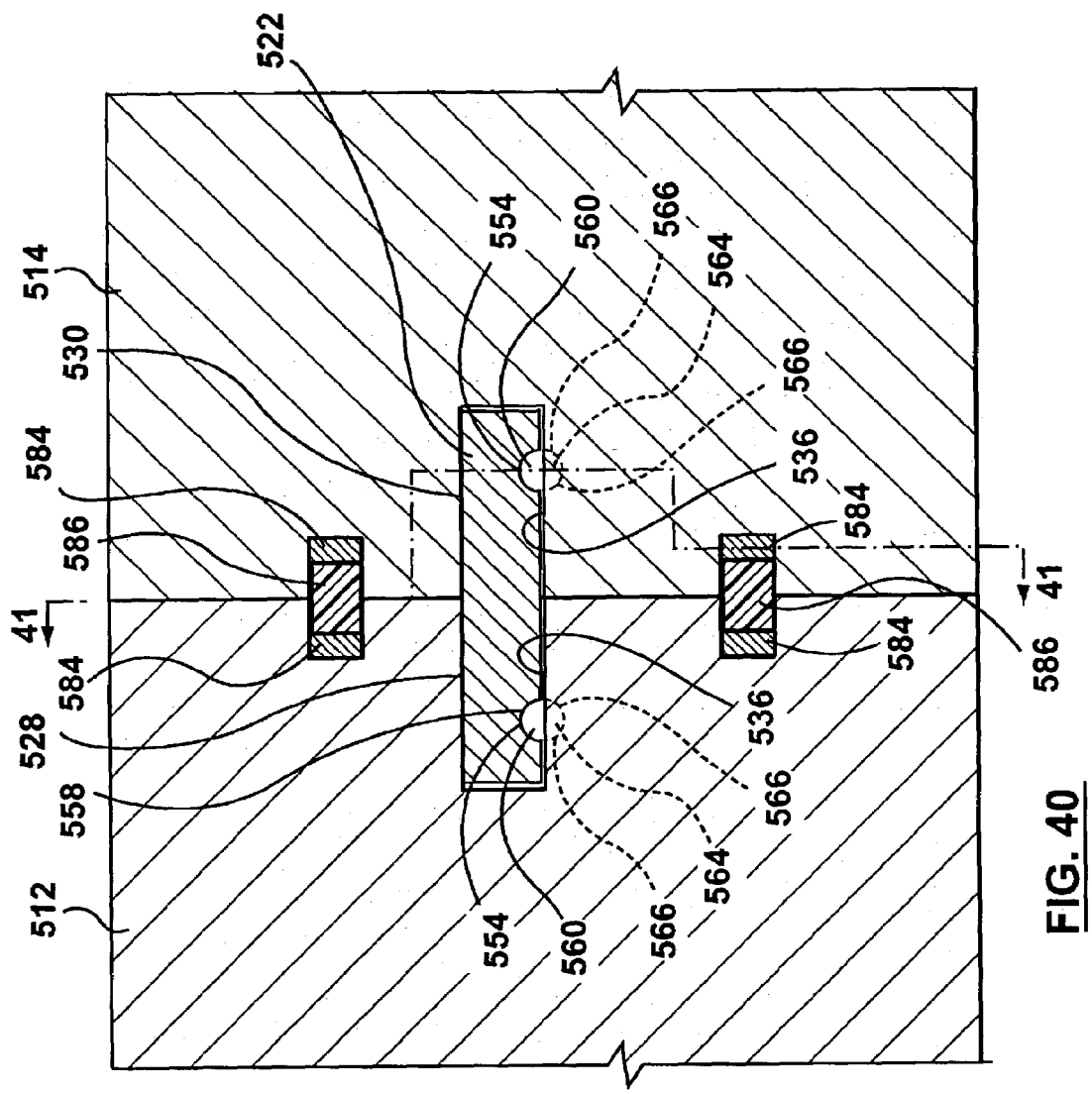
FIG. 40 is a top cross-sectional view of the butt joint connection structure of FIG. 1.

The interaction of the fasteners 524 and the recesses 554 will now be described. Referring to FIG. 40, the recesses 554 and the inner faces 536 of the grooves 528, 530 cooperate to provide apertures 560 for receiving the fasteners 524. The apertures 560 provide a cross-sectional area which is significantly less than the cross-sectional area of the fasteners 524. More particularly, in the embodiment illustrated, the fasteners 524 comprise spikes having a shaft 562 of generally circular cross-section (FIG. 37). The radius of the semi-circular recesses 554 is about equal to the radius of the circular shaft 562 of the spikes 524. Accordingly, the cross-sectional area of the apertures 560 is only about half that of the cross-sectional area of the shaft 562 of the spikes 524.

As a result, the spikes 524 must be forced into the semi-circular apertures 560 for assembly of the butt joint connection structure 510. This generates a significant lateral force, pressing the outer face 552 of the spline 522 against the outer side faces 538 of the grooves 528, 530. This force impedes any relative movement between the spline 522 and the logs 512, 514, thereby securing the butt joint connection structure 510.

Furthermore, forcing the spikes 524 into the apertures 560 can create depressions 564 (shown in phantom in FIG. 40) in the logs 512, 514, opposite the recesses 554 provided in the spline 522. The depressions 564 have log catch surfaces 566 which extend into the inner side faces 536 of the grooves 528, 530. By forming the depressions 564 upon insertion of the spikes 524 into the apertures 560, the log catch surfaces 566 are necessarily aligned with the opposing spline catch surfaces 558 of the recesses 554.

Accordingly, the shaft 562 of the spikes 524 engages the catch surfaces 558 and 566 formed along the inner surfaces of the apertures 560, and thereby prevent any horizontal movement of the spline 522 relative to the logs 512, 514. In other words, by extending transversely across the interface between the spline 522 and the grooves 528, 530, and by engaging the respective transverse catch surfaces 558, 566, the shaft 562 of the spikes 524 locks the logs 512 and 514 together.

Referring again to FIG. 37, the butt joint connection structure 510 can further comprise seal assemblies 570. The seal assemblies 570 are adapted to be received in seal slots 572, which span the seam 520 between the adjacent end faces 516, 518, of the logs 512, 514.

In the embodiment illustrated, two seal slots 572 are provided in the butt joint connection structure 510. More specifically, one seal slot 572 is provided between the spline slot 526 and the inner side surface 216 of the logs 512, 514, and another seal slot 572 is provided between the spline slot 526 and the outer side surface 218 of the logs 512, 514. The seal slots extend vertically along the cross-sectional height of the logs 512, 514, and extend horizontally in a direction generally parallel to the common axis of the logs 512, 514.

Referring again to FIG. 38, each seal slot 572 is formed of opposed seal grooves 574 and 576 provided along the end faces 516 and 518 of the logs 512, 514 respectively. Each seal groove has an end wall 578 and opposed side surfaces 580 and 582 extending between the end wall 578 and the end face 516, 518. The side surfaces 580, 582 of the grooves 574 are in alignment with the side surfaces 580, 582 of the grooves 576, thereby forming the generally continuous seal slots 572 extending between the end walls 578.

Referring again to FIG. 37, the seal assemblies 570 comprise stiffening bars 584 which are affixed to a sealing element 586. The sealing element is preferably compressible, and may be, for example, but not limited to, asphalt-impregnated sealant tape. The stiffening bars can be of generally rectangular cross-section, and may be constructed of, for example, but not limited to, wood or plastic.

In the embodiment illustrated, the seal assemblies 570 comprise two stiffening bars 584 provided on opposite sides of the sealing element 586. Each stiffening bar 584 has an inner face 588 adjacent the sealing element 586, and an outer face 590 in contact with an end wall 578 of the seal slot 572. The stiffening bars 584 and the sealing element 586 have a height which is generally equal to the cross-sectional height of the logs 512, 514.

In the relaxed, unassembled state, the seal assemblies 570 have a thickness which fits snugly within the distance between the opposed side surfaces 580 and 582 of the seal slots 572, and the seal assemblies have a width which exceeds the distance between the opposed end walls 578 of the seal slots 572. Accordingly, to insert the seal assembly into the seal slot 572, the two stiffening bars 584 must be pressed together, thereby compressing the sealing element 586. The seal assembly may then be pressed into the seal slot 572, by applying force on the upper ends of the stiffening bars 584. The stiffening bars facilitate proper placement of the sealing element 586 along the height of the logs 512, 514, by preventing the sealing element 586 from folding or crumpling upon insertion into the seal slots 572.

Figure 41:
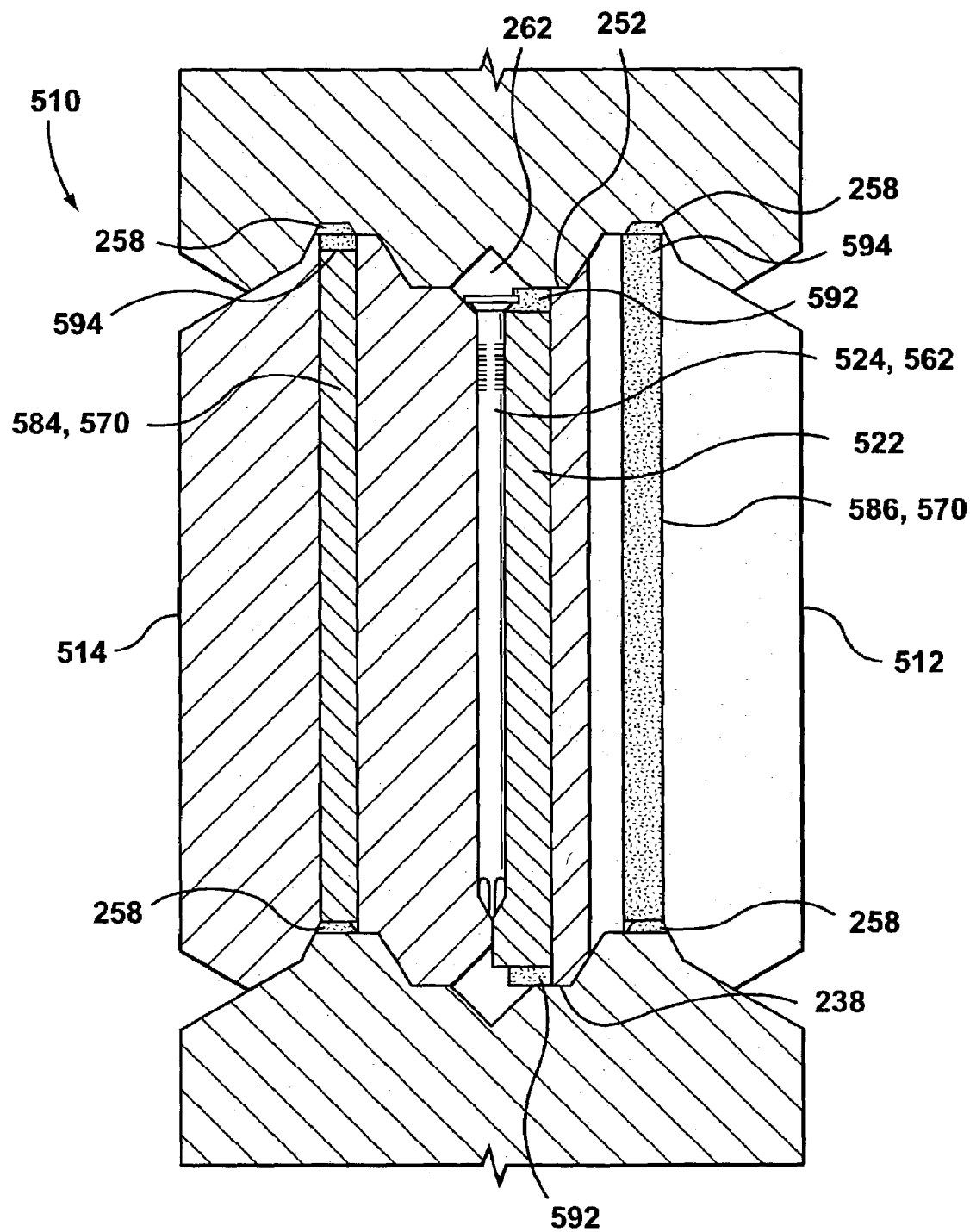
FIG. 41 is a section view of FIG. 40 taken along the line 41—41.

As best seen in FIGS. 37 and 41, the butt joint connection structure 510 can be provided with horizontal seals 592 and 594, to further enhance the weather-proofing characteristics of the butt joint 510. The seals 592, 594 can be, for example, but not limited to, asphalt-impregnated tape.

The seals 592 are provided adjacent the upper and lower edges of the butt spline 522. Accordingly, as best seen in FIG. 41, the upper and lower seals 592 are compressed between the upper end of the spline 522 and the plateau surface 252 of the log above the spline 522, and the lower end of the spline 522 and the channel surface 238 of the log below the spline 522.

The seals 594 are provided adjacent the upper ends of the seal assemblies 570. The horizontal position of the seal assemblies 570 along the cross sectional width of the logs 16 can be advantageously aligned with the sealant 258 provided in the recesses 250 in the logs 16 (FIG. 41). Accordingly, the seals 594 are compressed between the upper ends of the seal assemblies 570 and the adjacent sealant 258. The lower end of each seal assembly 570 bears directly against the adjacent sealant 258. Additional seals 594 could be provided between the lower ends of the seal assemblies 570 and the adjacent sealant 258.

As seen in FIG. 41, the apertures 262 advantageously provide clearance between vertically adjacent logs to accommodate the head of the fastener 524.

Post-to-Log Connection Structure

Figure 42:
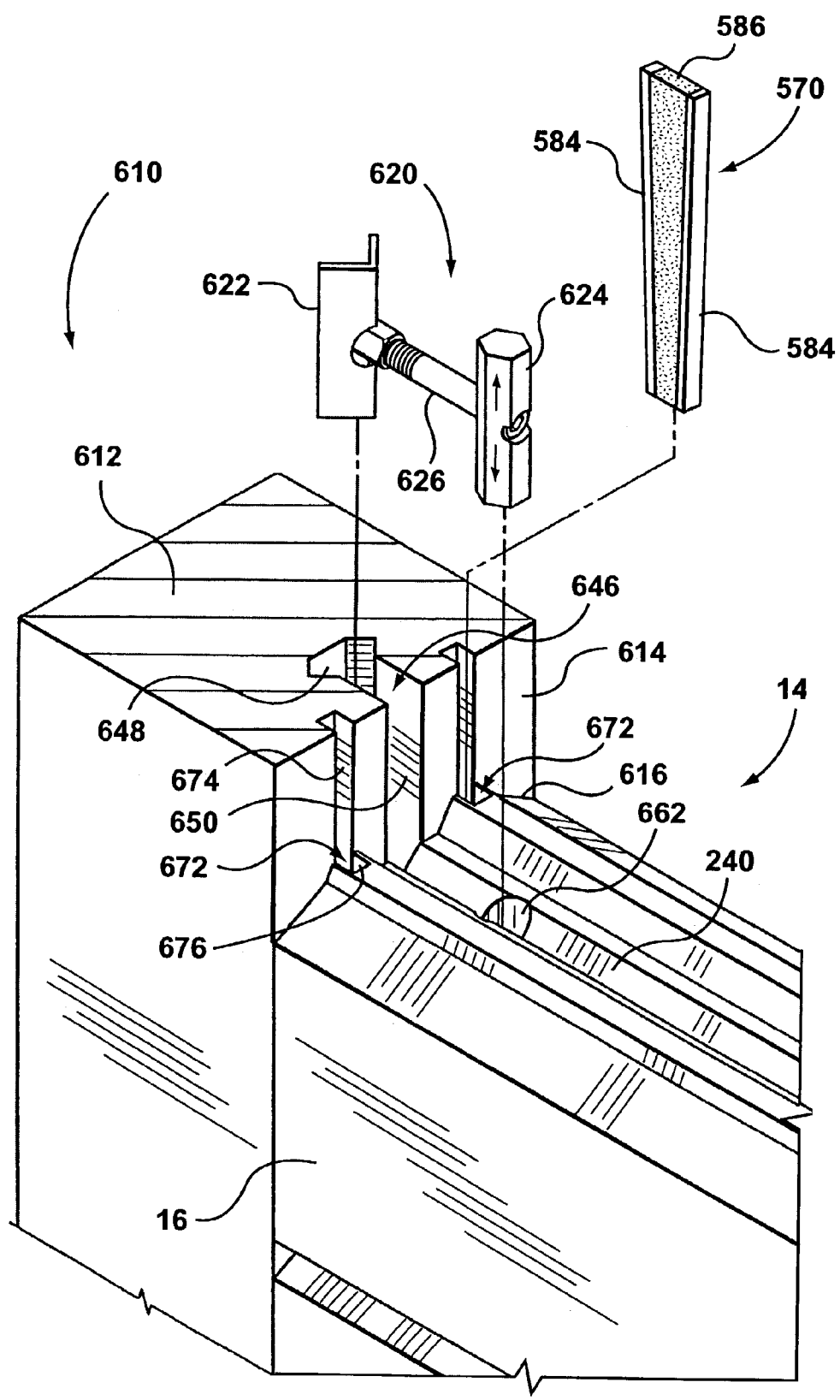
FIG. 42 is an exploded perspective view of a post-to-log connection structure according to the present invention.

A post-to-log connection structure according to the present invention is shown generally at 610 in FIG. 42. The post-to-log connection structure 610 has a generally vertical post 612 to which horizontal logs 16 of a wall 14 can be attached. The use of vertical posts 612 can provide a method of connecting intersecting walls 14, and can provide support points along a wall 14 which can advantageously reduce the required length of the logs 16.

The post 612 has a generally vertical joint face 614 which is shaped to engage end faces 616 of the logs 16 in substantially flush contact. In the embodiment illustrated, the joint face 614 and end faces 616 are planar surfaces oriented generally vertically, but other configurations could also be provided. Furthermore, in the embodiment illustrated, the vertical post 612 is generally square in cross-section, and a single joint face 614 for connection to logs 16 has been illustrated. The post 612 could have any one of a variety of cross-sectional profiles, including, for example, but not limited to, hexagonal or octagonal. The post 612 would generally be provided with at least two joint faces 614.

The connection structure 610 further comprises a link assembly 620 for coupling the logs 16 to the post 612. The link assembly 620 comprises a post-engaging clamp bracket 622, a log-engaging connector 624, and a fastener 626 extending between the bracket 622 and connector 624.

Figures 43, 44:
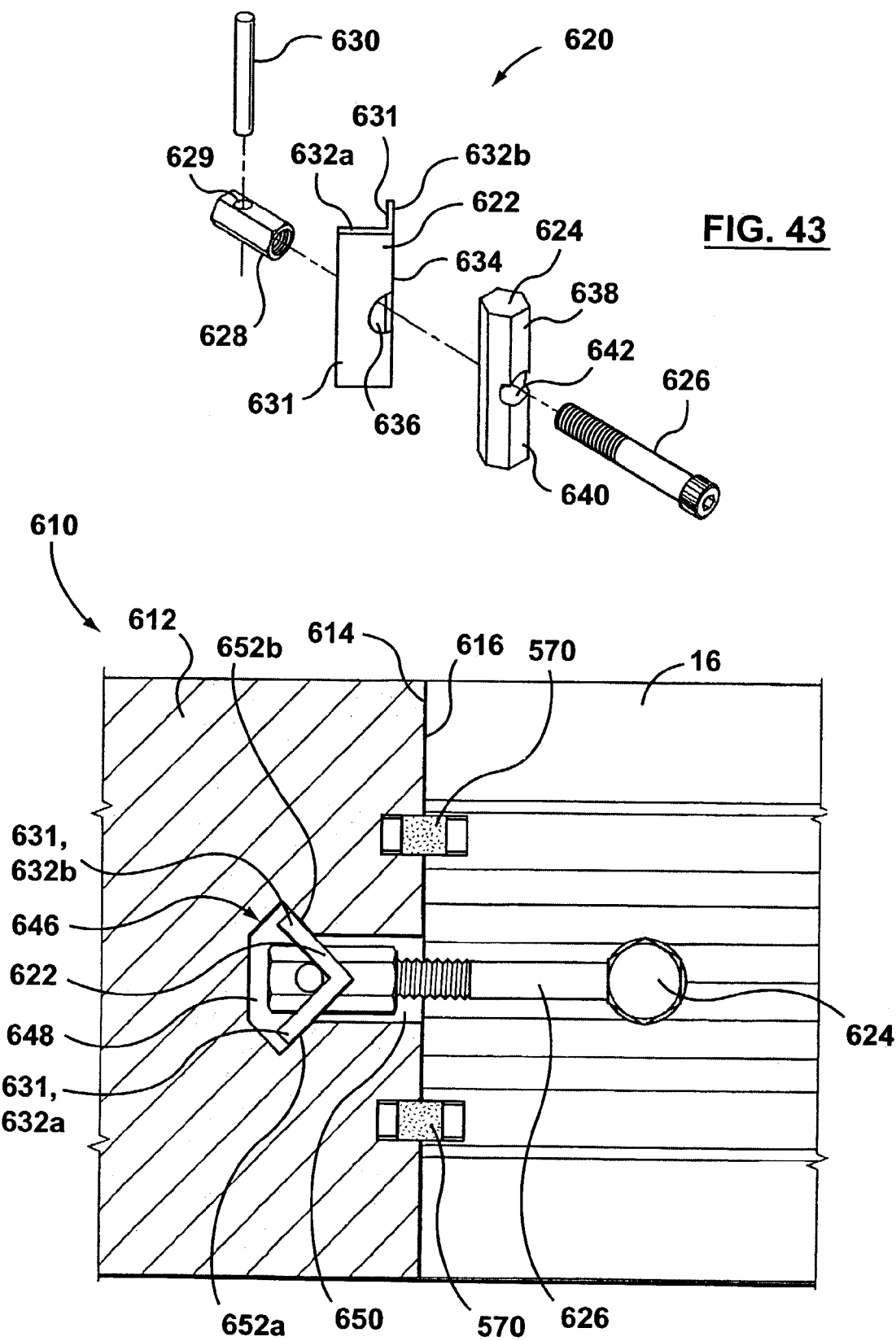
FIG. 43 is an exploded view of a component of the of the connection structure of FIG. 42.
FIG. 44 is a top view of the connection structure of FIG. 42.

As best seen in FIG. 43, in the embodiment illustrated, the fastener 626 is a socket head cap screw. An elongate hex nut 628 is threaded onto the end of the fastener 626. A lock pin 630 is provided transversely through a distal end of the nut 628, for purposes which will be described hereinafter. The lock pin 630 can be press fit into a corresponding bore 629 provided through the nut 628.

The clamp bracket 622 has lateral clamp arm ends 631 which extend beyond the profile of the hex nut 628. In the embodiment illustrated, the clamp arm ends 631 comprise horizontally outer portions of a pair of flanges 632a, 632b, which are connected along a leading edge 634 to form a v-shaped profile. In the link assembly 620, the leading edge 634 of the bracket 622 is directed towards the connector 624. The bracket 622 has an aperture 636 which is generally centrally located, and intersects the leading edge 634. The aperture 636 is sized to allow passage and rotation of the hex nut 628 within the aperture 636.

The connector 624 has upper and lower log engagement portions 638, 640, respectively, which are adapted to engage vertically adjacent logs 16 in the wall 14. In the embodiment illustrated, the connector 624 is a vertically oriented dowel pin of hexagonal cross-sectional profile. The connector 624 also has a horizontal bore 642 positioned between the upper and lower log engagement portions 638, 640, which is adapted to receive the fastener 626. More specifically, the bore 642 is sized to permit sliding passage of the shaft of the fastener 626, and is counter-bored opposite the bracket 622 to provide a recessed fit for the head of the fastener 626 (FIG. 42).

The post 612 is provided with a channel 646 extending along the joint face 614. The channel 646 has a bracket housing portion 648 shaped to receive the bracket 622, and a slot portion 650 extending between the bracket housing portion 648 and the joint face 614. The bracket housing portion 648 is provided with oblique retaining shoulders 652a, 652b which are shaped and positioned to engage the flanges 632a, 632b of the bracket 622. More specifically, the retaining shoulders 652a, 652b in the embodiment illustrated extend outwardly from either side of the slot portion 650 of the channel 646, and away from the joint face 614 (FIG. 44).

The logs 16 are provided with upper and lower connector apertures 662, 664, which are the same as the connector apertures 342, 344, provided in the opening support structure 310 of the present invention. The upper and lower connector apertures 662, 664 in vertically adjacent logs 16 are shaped to receive the lower and upper log engagement portions 640, 638, respectively, of the connector 624.

In use, the post 612 is positioned adjacent a log 16, so that the joint face 614 of the post 612 is in flush contact with the end face 616 of the log 16.

The bracket 622 of the link assembly 620 can then be aligned with, and slidingly inserted into, the bracket housing portion 648 of the channel 646 in the post 612. The link assembly 620 is lowered to a point where the connector 624 contacts the log 16. The connector 624 can then be aligned with the aperture 662 by orienting the connector 624 to the vertical and adjusting the fastener 626 as may be required to obtain the correct spacing between the bracket 622 and the connector 624. During the alignment process, the lock pin 630 passing through the nut 628 can be advantageously seated within the converging flanges 632a, 632b to provide an anti-rotate coupling arrangement of the nut 628 and the fastener 626.

Once aligned, the connector 624 can be tapped or pressed into place, so that the lower log engagement portion 640 of the connector 624 engages the upper connector aperture 662 in the log 16. The lowermost installed position of the connector 624 is achieved when the shank of the fastener 626 bottoms out in the v-groove 240 provided along the top surface of the log 16.

Once the connector 624 has been installed, the fastener 626 can be tightened to draw the post 612 and the log 16 snugly together. In particular, with reference to FIG. 44, tightening the fastener 626 draws the clamp bracket 622 towards the connector 624. Accordingly, the flanges 632a, 632b of the bracket 622 bear against the retaining shoulders 652a, 652b, of the channel 646. This provides a reliable connection and also serves to horizontally align the log 16 and the post 612, due to the oblique angle at which the retaining shoulders 652 and flanges 632 are provided.

After tightening the fastener 626, the next log 16 may be laid down, ensuring that the lower connector aperture 664 in the lower surface of the next log is aligned with and engages the upper log engagement portion 638 of the connector 624.

Accordingly, the post-to-log connection structure 610 provides a secure joint which stabilizes the logs horizontally in a direction perpendicular to the axis of the logs 16, but also draws the logs 16 snugly against the post 612. Moreover, the bracket 622 can shift in a vertical direction relative to the post 612, allowing the post-to-log connection structure 610 to accommodate natural settling of the logs 16 relative to the post 612 over time.

The post-to-log connection structure 610 can further be provided with a seal assembly 570, as provided in the butt joint connection structure 510. In the embodiment illustrated, two seal slots 672 are provided, each seal slot 672 being shaped to receive a seal assembly 570.

Each seal slot 672 spans the seam between the joint face 614 of the post 612, and the end face 616 of the log 16. The seal slots 672 are similar to the seal slots 572, being formed of opposed seal grooves 674 and 676 provided along the joint face 614 of the post 612 and the end face 616 of the log 16, respectively. As for the butt joint connection structure 510, the seal assemblies 570 may be inserted into seal slots 672 of the post-to-log connection structure 610 by pressing the stiffening bars 584 together, so that the sealing element 586 is compressed. The seal assembly 570 may then be inserted into the slot 672 by applying a downward force to the upper ends of the stiffener bars 584.

Figure 45:
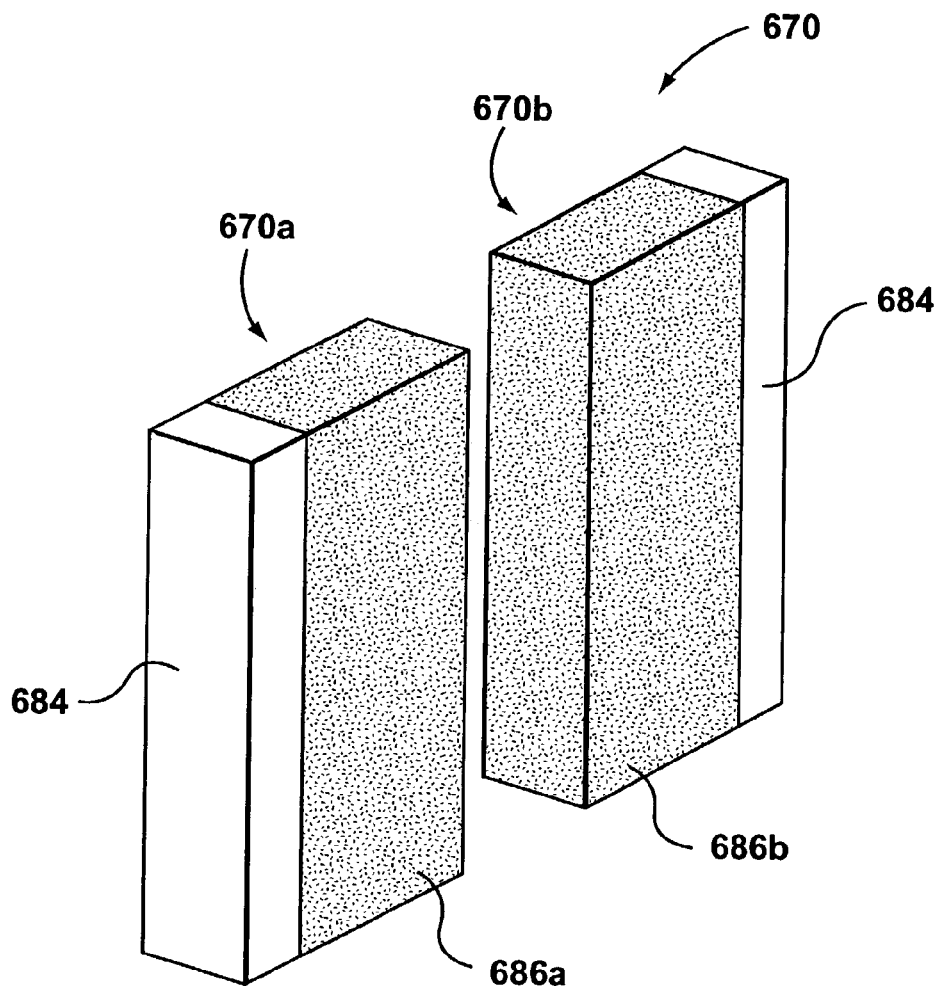
FIG. 45 is a perspective view of alternative seal assembly for use with the present invention.

Referring to FIG. 45, an alternative seal assembly 670 is illustrated. The seal assembly 670 may be used as an alternative to the seal assembly 570 in either of the butt joint connection structure 510 or post-to-log connection structure 610 of the present invention.

The seal assembly 670 is provided with a pair of opposed stiffener bars 684, but rather than having a single sealing element 586 extending between the bars 684, two separate sealing elements 686a and 686b are provided. Each of the sealing elements 686a., 686b are affixed to only one stiffener bar 684. Accordingly, the seal assembly 670 comprises two seal sub-assemblies 670a and 670b.

Figure 46:
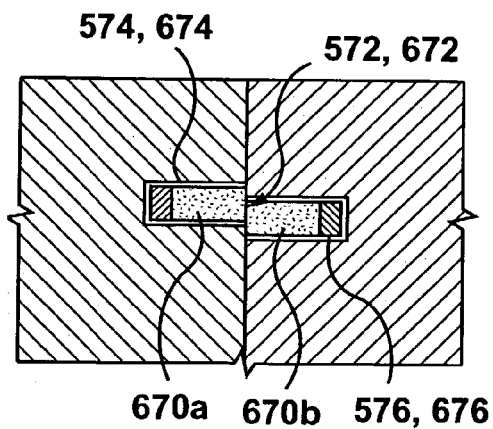
FIG. 46 is a top view of the assembly of FIG. 45 shown in combination with a misaligned slot.

The seal assembly 670 can advantageously be used in cases where the grooves 574 and 576, or 674 and 676, are not in precise alignment with each other (FIG. 46). The slots 572, 672 so formed can have an offset along the seams which they span. Accordingly, one seal sub-assembly 670a, 670b can be squeezed into each groove 574, 674 or 576, 676 such that the sealing portions 686a, 686b abut each other at the seam, and improved weather-proofing can thereby be provided.

While preferred embodiments of the invention have been described herein in detail, it is to be understood that this description is by way of example only, and is not intended to be limiting. The full scope of the invention is to be determined from reference to the appended claims.

The invention claimed is:

1. A corner connection structure for walls constructed of stacked horizontal logs, the corner connection structure comprising:
   a) a plurality of first and second logs for respective first and second walls and having respective first and second overlap portions shaped so that the first overlap portions of the first logs of the first wall are capable of overlapping and being alternately interlaced with the second overlap portions of the second logs of the second wall, each first and second log having a respective first and second log axis extending longitudinally thereof;
   b) a slot extending vertically through the first and second overlap portions of the first and second logs, the slot extending obliquely across the first and second overlap portions, relative to the first and second log axes, when viewed from above; and
   c) at least one spline shaped to fit in the slot.

2. The corner connection structure of claim 1 wherein the slot extends horizontally between opposed first and second vertical slot edges.

3. The corner connection structure of claim 2, wherein the first slot edge extends continuously through vertically adjacent first logs of the first wall, and the second slat edge extends continuously through vertically adjacent second logs of the of the second wall.

4. The corner connection structure of claim 3 wherein each of the first and second logs have respective first and second non-overlap portions horizontally adjacent the respective first and second overlap portions and within the respective first and second walls, the stacked non-overlap portions in each wall being free of alternate interlacing of the first and second logs.

5. The corner connection structure of claim 4 wherein the first slot edge extends vertically through stacked ones of the first non-overlap portions of the first wall, and the second slot edge extends vertically through stacked ones of the second non-overlap portions of the second wall.

6. The corner connection structure of claim 3 further comprising at least one spline in the slot.

7. The corner connection structure of claim 6 wherein the at least one spline includes a plate portion and a locking rib extending therefrom, the locking rib having a thickness extending transversely of the plate portion, and the slot including a transversely extending rib recess for receiving the locking rib.

8. A corner connection structure for walls constructed of stacked horizontal logs, the corner connection structure comprising:
   a) logs having overlap portions shaped so that the overlay portions of the logs of a first wall are capable of overlapping and being alternately interlaced with the overlay portions of the logs of a second wall;
   b) a generally vertical slot extending through the overlap portions of the logs; and
   c) at least one spline shaped to fit in the slot, the spline including a plate portion and a locking rib extending therefrom, the locking rib having a thickness extending transversely from the plate portion, and wherein the slot has a corresponding transversely extending rib recess for receiving the locking rib.

9. The corner connection structure of claim 8 wherein the locking rib is oriented generally vertically, and the plate portion extends horizontally outwardly from either side of the locking rib.

10. The corner connection structure of claim 8 wherein the locking rib has an outer surface which in cross-section provides interspersed contact areas and non-contact areas with the inner surface of the rib recess.

11. The corner connection structure of claim 10 wherein the rib recess comprises a generally cylindrical bore positioned adjacent the slot.

12. The corner connection structure of claim 11 wherein the cylindrical bore of the rib recess is positioned towards the outer sidewall of the slot, and the cylindrical bore is tangentially intersected by the slot.

13. The corner connection structure of claim 11 wherein the outer surface of the rib is polygonal having a plurality of vertices, the vertices providing the contact areas with the inner surface of the cylindrical bore.

14. The corner connection structure of claim 11 wherein a plurality of splines are provided in the slot to form a stack of splines, and wherein the connection structure further comprises:
   a) a generally vertical bolt cavity extending through the stack of splines;
   b) a through bolt extending through the bolt cavity; and
   c) clamping elements coupled to the through bolt and positioned adjacent the upper and lower ends of the stack of splines, the clamping elements being adjustable to clamp together the plurality of splines in the stack of splines.

15. The corner connection structure of claim 8 further provided with a generally vertical bolt cavity extending through the overlap portions of the logs of the intersecting walls, and having a through-bolt clamping apparatus, the through-bolt clamping apparatus comprising:
   a) a through-bolt, the through bolt extending through the bolt cavity;
   b) a lower clamp arm coupled to the through-bolt and the bottom of the intersecting walls; and
   c) an upper clamp arm coupled to the through bolt and the top of the intersecting walls.

16. The corner connection structure of claim 15 wherein the bolt cavity is provided substantially within the locking rib of the spline.

17. The corner connection structure of claim 15 wherein at least one of the upper and lower clamp arms comprises a transfer bar, the transfer bar having spaced apart first and second contact pads, the first contact pad engaging the first intersecting wall at a position spaced horizontally away from the corner joint ares, and the second contact pad engaging the second wall at a position spaced horizontally away from the corner joint area, the corner joint area being defined as the stacked overlap portions of the intersecting logs.

18. The corner connection structure of claim 15 wherein each of the upper and lower clamp arms comprises a transfer bar, the transfer bar having spaced apart first and second contact pads, the first contact pad engaging the first intersecting wall at a position spaced horizontally away from the corner joint area, and the second contact pad engaging the second wall at a position spaced horizontally away from the corner joint area, the corner joint area being defined as the stacked overlap portions of the intersecting logs.

19. The corner connection structure of claim 15 wherein an anti-rotate coupling device is provided to couple the lower clamp arm to the through-bolt.

20. The corner connection structure of claim 19 wherein the anti-rotate coupling device comprises an elongate hex-nut, and wherein the bolt cavity has an inner surface which is hexagonal in cross-section and is shaped to slidingly receive the elongate hex-nut.

21. A Garner connection structure for walls constructed of stacked horizontal logs, the corner connection structure comprising:
   a) a plurality of first and second logs for respective first and second walls and having respective first and second overlap portions shaped so that the first overlap portions of the first logs of a first wall are capable of overlapping and being alternately interlaced with the second overlap portions of the second logs of a second wall;
   b) a generally vertical slot extending through the first and second overlap portions of the logs; and
   c) at least one spline shaped to fit in the slot, the spline including a plate portion and a locking rib extending therefrom, the locking rib having a thickness extending transversely from of the plate portion, and wherein the slot has a corresponding transversely extending rib recess for receiving the locking rib.

22. The corner connection structure of claim 21 further comprising a bolt cavity extending vertically through the first and second overlap portions of the first and second logs, and a through-bolt extending through the bolt cavity.

23. The corner connection structure of claim 22 further comprising upper and lower clamp members coupled to the through-bolt and to respective top and underside surfaces of at least one of the first and second walls for exerting a compressive force on the corner connection of the first and second walls.

24. The corner connection structure of claim 23 wherein the lower clamp member comprises an anti-rotate anchoring assembly providing a coupling for engaging a lower portion of the through-bolt the coupling fixed against axial and rotational movement relative to said underside surface of at least one of the first and second walls.

25. The corner connection structure of claim 24 wherein the anti-rotate anchoring assembly comprises an anchor plate having a transversely extending lower clamp arm with an upper surface for engaging said underside surface of at least one of the first and second walls.

26. The corner connection structure of claim 24 wherein the bolt cavity extends through the at least one spline.

27. The corner connection structure of claim 26 further comprising a plurality of splines provided in the slot to form a stack of splines, the stack of splines having an upper and a lower end generally defining a vertical extent thereof.

28. The corner connection structure of claim 27 further comprising a spline-stacking fastener coupled to the through-bolt and at least one of the upper and lower ends of the stack of splines, the spline-stacking fastener being adjustable to clamp together the plurality of splines in the stack of splines.

29. A corner connection structure for walls constructed of stacked horizontal logs, the corner connection structure comprising:
   a) a plurality of first and second logs stacked in respective first and second walls, the first and second logs having respective first and second overlap portions shaped so that the first overlap portions of the first logs of the first wall are capable of overlapping and being alternately interlaced with the second overlap portions of the second logs of the second wall, the first and second logs having respective first and second non-overlap portions horizontally adjacent the overlap portions and within the respective first and second walls;
   b) each of the first and second logs having in cross-section opposing top and bottom surfaces and opposing side surfaces extending between the top and bottom surfaces, the vertical spacing between the top and bottom surfaces defining a log height;
   c) a first groove provided in each of the first overlap portions of the first logs, the first groove defined by opposed first inner and first outer side faces and a first closed edge face extending therebetween, the first inner side, outer side, and closed edge faces extending vertically through the height of the first log, the first inner and outer side faces extending horizontally from a respective one of the first side surfaces of the first log defining a first open edge face generally opposite the first closed edge face;
   d) a second groove provided in each of the second overlap portions of the second logs, the second groove defined by opposed second inner and second outer side faces and a second closed edge face extending therebetween, the second inner side, outer side, and closed edge faces extending vertically through the height of the second log, the second side faces extending horizontally from a respective one of the second side surfaces of the second log defining a second open edge face generally opposite the second closed edge face;
   e) at least portions of the first and second grooves aligning in vertical registration with each other to form a slot extending vertically through the first and second overlap portions of the first and second logs; and
   f) at least one spline shaped to fit in the slot.

30. The corner connection structure of claim 29 wherein for each of the first and second logs, respectively, the inner and outer side faces of the respective grooves intersect said respective ones of the side surfaces of the respective logs along the overlapping portions thereof.

31. The corner connection structure of claim 30 wherein, for each of the first and second logs, respectively, the closed edge faces of the respective grooves extend vertically between the top and bottom surfaces of the respective logs along the non-overlapping portions thereof.

* * * * *